(12) United States Patent
Oyama et al.

(10) Patent No.: US 10,542,214 B2
(45) Date of Patent: Jan. 21, 2020

(54) IMAGE CAPTURING CONTROL APPARATUS, DISPLAY CONTROL APPARATUS, AND METHOD FOR CONTROLLING THE SAME

(71) Applicant: CANON KABUSHIKI KAISHA, Tokyo (JP)

(72) Inventors: Yasufumi Oyama, Kawasaki (JP); Kazuya Miyahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/985,493

(22) Filed: May 21, 2018

(65) Prior Publication Data

US 2018/0270421 A1    Sep. 20, 2018

Related U.S. Application Data

(63) Continuation of application No. 14/850,827, filed on Sep. 10, 2015, now Pat. No. 10,097,755.

(30) Foreign Application Priority Data

| Sep. 12, 2014 | (JP) | ................................. 2014-186861 |
| Sep. 12, 2014 | (JP) | ................................. 2014-186862 |

(51) Int. Cl.
| H04N 5/77 | (2006.01) |
| H04N 5/232 | (2006.01) |
| H04N 9/804 | (2006.01) |
| H04N 9/82 | (2006.01) |

(52) U.S. Cl.
CPC ..... H04N 5/23245 (2013.01); H04N 5/23216 (2013.01); H04N 5/772 (2013.01); H04N 9/8042 (2013.01); H04N 9/8227 (2013.01)

(58) Field of Classification Search
None
See application file for complete search history.

(56) References Cited

U.S. PATENT DOCUMENTS

| 10,097,755 | B2* | 10/2018 | Oyama | ............... | H04N 5/23245 |
| 2008/0246851 | A1* | 10/2008 | Jung | ................... | H04N 5/44513 |
| | | | | | 348/222.1 |
| 2010/0281375 | A1* | 11/2010 | Pendergast | ........... | G11B 27/034 |
| | | | | | 715/723 |
| 2011/0085778 | A1* | 4/2011 | Iwase | ................... | G11B 27/034 |
| | | | | | 386/228 |

* cited by examiner

*Primary Examiner* — Eileen M Adams
(74) *Attorney, Agent, or Firm* — Canon U.S.A., Inc. I.P. Division

(57) ABSTRACT

A control apparatus includes a measuring unit configured to measure an elapsed time after start of recording movie, a set movie creation unit configured to create a set of movies from a plurality of movies, a display control unit configured to perform control so as to display a plurality of sections respectively corresponding to the set of movies, and to display a section corresponding to a recorded movie in a first display appearance, and to display a section corresponding to a not-recorded movie in a second display appearance, wherein the display control unit is further configured to perform control to display, a portion indicating a rate of an elapsed time in the first display appearance, and a remaining portion in the second display appearance.

15 Claims, 15 Drawing Sheets

FIG. 8A-1

MOVIE FILE — 801

| MOVIE FILE | |
|---|---|
| FILE NAME | 000.mov |
| FIRST CHAPTER | |
| RECORDING DATE AND TIME | 20//** hh:mm:ss |
| MOVIE DATA | |
| THUMBNAIL | |
| SECOND CHAPTER | |
| RECORDING DATE AND TIME | 20//** hh:mm:ss |
| MOVIE DATA | |
| THUMBNAIL | |
| THIRD CHAPTER | |
| RECORDING DATE AND TIME | 20//** hh:mm:ss |
| MOVIE DATA | |
| THUMBNAIL | |
| FOURTH CHAPTER | |
| RECORDING DATE AND TIME | 20//** hh:mm:ss |
| MOVIE DATA | |
| THUMBNAIL | |
| MOVIE FILE ID | |
| ...Etc. | |

FIG. 8A-2

| FIRST CHAPTER | | |
|---|---|---|
| FILE NAME | 0001.mov | ←803 |
| RECORDING DATE AND TIME | 20//** hh:mm:ss | |
| THUMBNAIL | | |
| MOVIE DATA | | |
| MOVIE FILE ID | AAAA | ←804 |
| SET INFORMATION | AAAA | ←802 |

| SECOND CHAPTER | | |
|---|---|---|
| FILE NAME | 0002.mov | |
| RECORDING DATE AND TIME | 20//** hh:mm:ss | |
| THUMBNAIL | | |
| MOVIE DATA | | |
| MOVIE FILE ID | BBBB | |
| SET INFORMATION | AAAA | ←802 |

| THIRD CHAPTER | | |
|---|---|---|
| FILE NAME | 0003.mov | |
| RECORDING DATE AND TIME | 20//** hh:mm:ss | |
| THUMBNAIL | | |
| MOVIE DATA | | |
| MOVIE FILE ID | CCCC | |
| SET INFORMATION | AAAA | ←802 |

| FOURTH CHAPTER | | |
|---|---|---|
| FILE NAME | 0004.mov | |
| RECORDING DATE AND TIME | 20//** hh:mm:ss | |
| THUMBNAIL | | |
| MOVIE DATA | | |
| MOVIE FILE ID | DDDD | |
| SET INFORMATION | AAAA | ←802 |

FIG. 8B

| MOVIE FILE | | ←805 |
|---|---|---|
| FILE NAME | 0005.mov | |
| RECORDING DATE AND TIME | 20//** hh:mm:ss | |
| THUMBNAIL | | |
| MOVIE DATA | | |
| MOVIE FILE ID | AAAA | |
| ...Etc. | | |

IMAGE CAPTURING CONTROL APPARATUS, DISPLAY CONTROL APPARATUS, AND METHOD FOR CONTROLLING THE SAME

CROSS-REFERENCE TO RELATED APPLICATIONS

This application is a continuation, and claims the benefit, of U.S. patent application Ser. No. 14/850,827, presently pending and filed on Sep. 10, 2015, and claims the benefit of, and priority to, Japanese Patent Application No. 2014-186861, filed Sep. 12, 2014, and Japanese Patent Application No. 2014-186862, filed Sep. 12, 2014, which applications are hereby incorporated by reference herein in their entireties.

BACKGROUND OF THE INVENTION

Field of the Invention

The present invention relates to a technique for recording a plurality of movies to create a set of movies.

Description of the Related Art

In a series of image capturing operations in which movies recorded according to image capturing instructions issued at different timings are recorded in association with one another, in some cases, the recording times and the number of movies to be recorded are set in advance. In addition, there has been proposed a method for ending movie recording upon the set recording time elapse irrespective of a user operation, or ending the series of image capturing operations in response to the preset number of movies being recorded.

Japanese Patent Application Laid-Open No. 2007-208761 discloses a method of selecting a situation in which shooting is to be performed, from among a plurality of situations included in a preset scenario, performing shooting for each situation, and recording a series of situations as one project. Japanese Patent Application Laid-Open No. 2010-160628 discloses a method of displaying an elapsed time from recording start by arranging a bar near a screen during recording of a movie for which a recording time is predetermined, and changing a display color of the bar in such a manner as to pass a vertex or an index of each side every one second or 0.5 seconds.

Once the above-described series of recording operations ends, a user can obtain a set of movies constituted by the series of recorded movies, without editing the recorded movies. Thus, if recording is performed for the set recording time, or if the set number of movies are recorded, the user can complete a set of movies.

Nevertheless, in Japanese Patent Application Laid-Open No. 2007-208761, although a movie of a recording-finished situation and a movie of a recording-unfinished situation can be checked when selecting a situation, during movie recording, neither the progress of the movie recording nor the progress of movie recording among a plurality of movies can be identified. In contrast, in Japanese Patent Application Laid-Open No. 2010-160628, while a movie is being recorded, the progress of the movie under recording can be identified, but Japanese Patent Application Laid-Open No. 2010-160628 fails to disclose a method for displaying, in a case in which a plurality of set movies is recorded, the progress of movie recording among the plurality of movies.

There is a movie recording method of applying a set effect. Japanese Patent Application Laid-Open No. 2009-77026 proposes an imaging apparatus capable of presetting a recording number of movie files to be recorded and a recording time of each movie file. The technique described in Japanese Patent Application Laid-Open No. 2009-77026 receives a movie recording start instruction of a movie by the press of a release button. In addition, if a preset recording time elapses, or if the release button is pressed before the recording time elapse, the movie recording is stopped. On the other hand, as described in Japanese Patent Application Laid-Open No. 2010-193063, there is a movie recording method for generating a movie with a slow motion effect by recording, at low frame rate, a movie recorded at high frame rate.

In the movie recording described in Japanese Patent Application Laid-Open No. 2009-77026, when it is assumed that a preset effect is applied to the recorded movie as in Japanese Patent Application Laid-Open No. 2010-193063, if the image recording is casually stopped by the same operation as that of the movie recording start instruction before the preset recording time elapse, a movie with the set recording time cannot be obtained. As a result, the obtained movie may not have the preset effect at an adequate level. Thus, a high-quality movie may not be obtained. For example, during movie recording for applying a slow motion effect to a movie recorded for 2 seconds, if the movie recording is casually stopped halfway, the resultant movie with the slow motion effect may have only 1 second.

SUMMARY OF THE INVENTION

The present invention has been devised in view of the above issue, and is directed to a technique for making, in movie recording for creating a set of movies from a plurality of movies, recording progress among all the movies constituting the set recognizable.

The present invention has been devised in view of the above issue, and is directed to a technique for reducing, in recording a movie to which an effect is to be applied, possibility that the recording of the movie is casually stopped.

According to an aspect of the present invention, a display control apparatus includes a measuring unit configured to measure an elapsed time after start of movie recording, a set movie creation unit configured to obtain a plurality of recorded movies, and to create a set of movies constituted by the plurality of movies, and a display control unit configured to perform control so as to display a plurality of sections respectively corresponding to the plurality of movies which constitute the set of movies consecutively so as to be adjacent to each other, and to display a section corresponding to a recorded movie among the plurality of movies in a first display appearance, and to display a section corresponding to a not-recorded movie among the plurality of movies in a second display appearance, wherein the display control unit is further configured to perform control so as to display, in a section corresponding to a movie which is under recording, a portion indicating a rate of an elapsed time measured by the measuring unit with respect to a preset recording time in the first display appearance, and to display a remaining portion in the section in the second display appearance.

Further features of the present invention will become apparent from the following description of exemplary embodiments (with reference to the attached drawings).

BRIEF DESCRIPTION OF THE DRAWINGS

FIG. 8A, which is composed of FIGS. 8A-1 and 8A-2, is a diagram illustrating a set of movies in creative movie recording of the digital camera 100 according to the present exemplary embodiment.

FIG. 8B is a diagram illustrating a movie file in movie recording in an automatic mode of the digital camera 100 according to the present exemplary embodiment.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
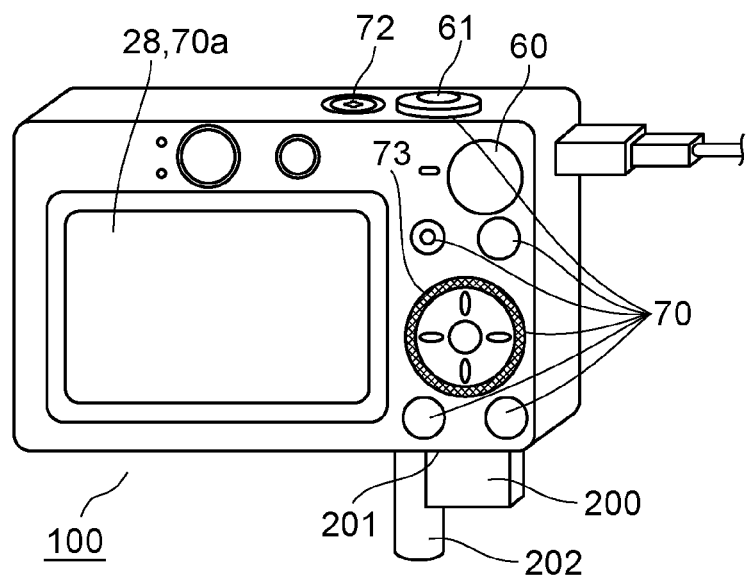
FIG. 1A is a diagram illustrating an exterior appearance of a digital camera.
Figure 1B:
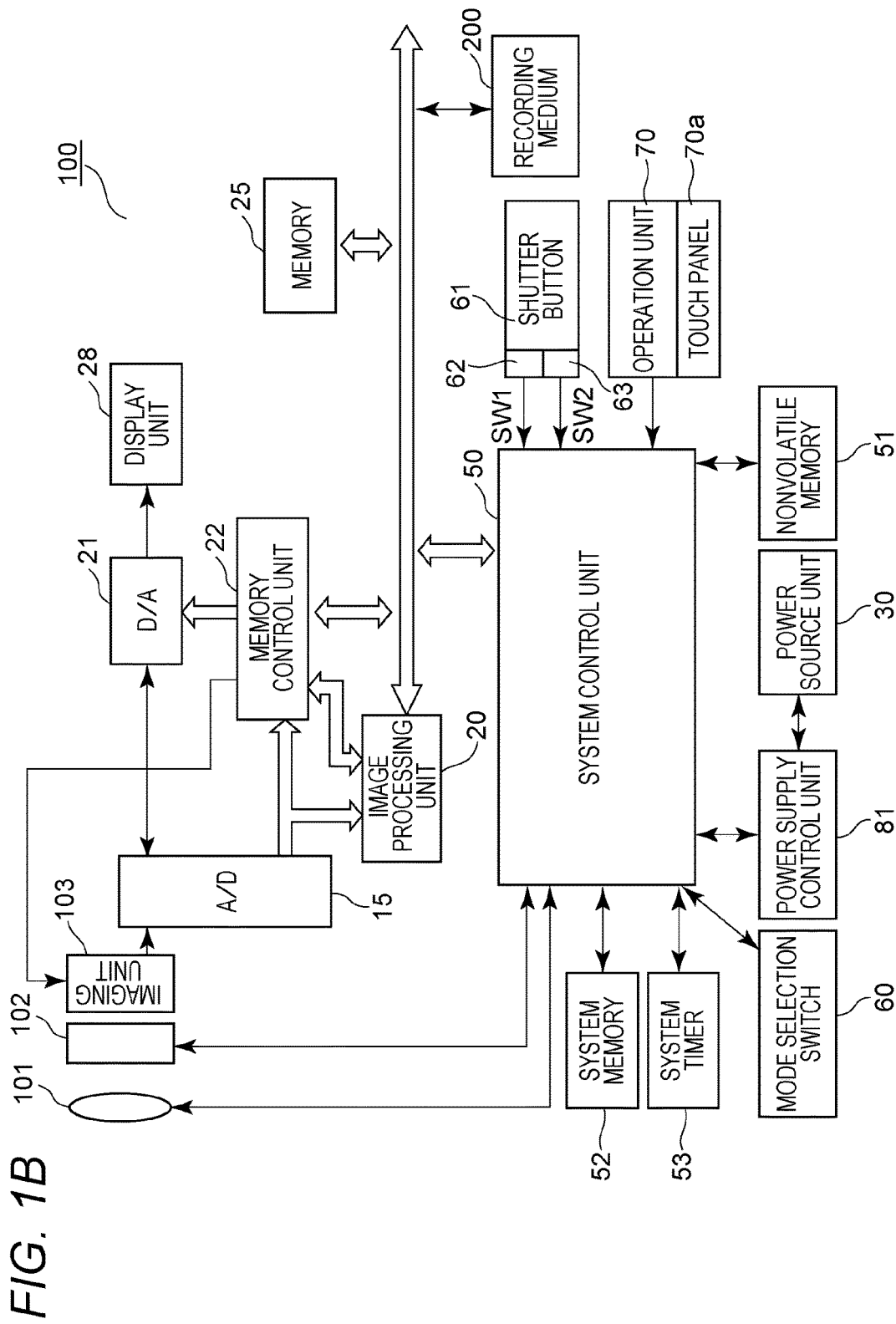
FIG. 1B is a block diagram of the digital camera.

FIG. 1A is an external view of a digital camera 100 serving as an example of an image capturing control apparatus and a display control apparatus to which the present invention is applicable. FIG. 1B is a block diagram illustrating a configuration example of the digital camera 100 serving as an example of the image capturing control apparatus and the display control apparatus according to the present invention.

A display unit 28 is a display unit for displaying an image and various types of information. A shutter button 61 is an operation unit for issuing an image capturing instruction. A mode selection switch 60 is an operation unit for switching various modes. An operation unit 70 is an operation unit including operation members such as various switches, buttons, and a touch panel 70a that are used for receiving various operations from a user. A controller wheel 73 is a rotationally-operable operation member included in the operation unit 70. A power switch 72 switches between power on and power off. A recording medium 200 is a recording medium such as a memory card and a hard disc. A recording medium slot 201 is a slot for storing the recording medium 200. Communication between the recording medium 200 stored in the recording medium slot 201 and the digital camera 100 becomes available to enable recording and reproduction. A lid 202 is a lid of the recording medium slot 201. FIG. 1A illustrates a state in which the lid 202 is opened, and part of the recording medium 200 is taken out from the recording medium slot 201 to be exposed.

The mode selection switch 60 switches an operation mode (selects a mode) of a system control unit 50 to any of a still image recording mode, a movie recording mode, a reproduction mode, and the like. The mode selection switch 60 can directly switch the operation mode to any of these modes included in menu buttons. Alternatively, the switching operation may be performed in the following manner. First, the mode selection switch 60 once switches display to menu buttons. Then, the operation mode is switched to any of these modes included in the menu buttons using another operation member. The movie recording mode also includes a plurality of modes.

In FIG. 1B, an imaging lens 101 is a lens unit including a zoom lens and a focusing lens. A shutter 102 is a shutter having an aperture function. An imaging unit 103 is an image sensor including a charge-coupled device (CCD) sensor or a complementary metal-oxide semiconductor (CMOS) sensor for converting an optical image into an electrical signal. An analog-to-digital (A/D) converter 15 converts an analog signal into a digital signal. The A/D converter 15 is used for converting an analog signal output from the imaging unit 103 into a digital signal.

An image processing unit 20 performs resize processing such as predetermined pixel interpolation and reduction, and color conversion processing on data from the A/D converter 15 or data from a memory control unit 22. In addition, the image processing unit 20 performs predetermined calculation processing using data of a captured image, and the system control unit 50 performs exposure control and ranging control based on the obtained calculation result. As a result, through-the-lens (TTL) system autofocus (AF) processing, automatic exposure (AE) processing, and flash preliminary emission (EF) processing are performed. The image processing unit 20 further performs predetermined calculation processing using data of a captured image, and also performs TTL system automatic white balance (AWB) processing based on the obtained calculation result.

A system timer 53 is a time measuring unit for measuring a time used for various types of control or a time of a built-in clock.

Output data from the A/D converter 15 is directly written into a memory 25 via the image processing unit 20 and the memory control unit 22, or via the memory control unit 22. The memory 25 stores image data obtained by the imaging unit 103 and converted by the A/D converter 15 into digital data, and image data to be displayed on the display unit 28. The memory 25 has a recording capacity sufficient for storing a predetermined number of still images, and a predetermined time of a movie and voice.

In addition, the memory 25 also serves as a memory (video memory) for image display. A digital-to-analog (D/A) converter 21 converts data for image display that is stored in the memory 25, into an analog signal to supply the analog signal to the display unit 28. In this manner, the image data for display that is written in the memory 25 is displayed by the display unit 28 via the D/A converter 21. The display unit 28 performs display according to the analog signal from the D/A converter 21, on a display device such as a liquid crystal display (LCD). The digital signals having been once A/D-converted by the A/D converter 15 and stored in the memory 25 are D/A-converted by the D/A converter 21, and consecutively transferred to the display unit 28 for display, thereby enabling a function as an electronic viewfinder and live view display.

A nonvolatile memory 51 is a memory serving as an electrically erasable/recordable recording medium. For example, an electrically erasable programmable read-only memory (EEPROM) or the like is used. Constants for operating the system control unit 50, programs, and the like are recorded in the nonvolatile memory 51. Here, the programs refer to computer programs for executing various flowcharts to be described below in the present exemplary embodiment.

The system control unit 50 controls the entire digital camera 100. By executing the above-described programs recorded in the nonvolatile memory 51, the system control unit 50 realizes each process of the present exemplary embodiment, which will be described below. A random access memory (RAM) is used as the system memory 52. Constants for operating the system control unit 50, variables, programs read from the nonvolatile memory 51, and the like are loaded into the system memory 52. In addition, the system control unit 50 also controls display by controlling the memory 25, the D/A converter 21, the display unit 28, and the like. If various operations are performed on the mode selection switch 60, the shutter button 61, the operation unit 70, the system control unit performs control so as to perform corresponding operations.

In addition, the system control unit 50 can detect (touch detection) the following operations performed on the touch panel 70a or the states thereof.

The new touch of a finger or a stylus that has not been touched on the touch panel, i.e., the start of touch (hereinafter, referred to as a "Touch-Down").

The release of a finger or a stylus that has been touched on the touch panel, i.e., the end of touch (hereinafter, referred to as a "Touch-Up").

The state in which nothing touches the touch panel (hereinafter, referred to as a "Touch-Off").

If the Touch-Down is detected, Touch-On is simultaneously detected. After the Touch-Down, normally, the Touch-On continues to be detected until the Touch-Up is detected. Touch-Move is detected also in a state in which the Touch-On is being detected. Even if the Touch-On is detected, Touch-Move is not detected unless the touch position moves. After the detection of the Touch-Up of all fingers or a stylus that have been touched on, the Touch-Off is detected.

A first shutter switch 62 is turned ON in the middle of an operation of the shutter button 61 provided on the digital camera 100, that is, by so-called half press thereof (i.e., an image capturing preparation instruction), thereby generating a first shutter switch signal SW1. According to the first shutter switch signal SW1, an operation of autofocus (AF) processing, automatic exposure (AE) processing, automatic white balance (AWB) processing, flash preliminary emission (EF) processing, or the like is started.

A second shutter switch 63 is turned ON upon completion of an operation of the shutter button 61, that is, by so-called full press thereof (i.e., an image capturing instruction), thereby generating a second shutter switch signal SW2 (an image capturing instruction operation). According to the second shutter switch signal SW2, the system control unit 50 starts operations of a series of imaging processes starting from the readout of a signal from the imaging unit 103 up to writing of image data onto the recording medium 200.

Operation members of the operation unit 70 are respectively assigned appropriate functions for each scene by, for example, selectively operating various functional icons displayed on the display unit 28, so as to act as various functional buttons. Examples of the functional buttons include an end button, a return button, an image feeding button, a jump button, a narrowing-down button, and an attribute change button. For example, if a menu button is pressed, a menu screen for enabling various settings to be performed is displayed on the display unit 28. The user can intuitively perform various settings using the menu screen displayed on the display unit 28, a four-direction (up, down, left, and right) button, and a SET button. In addition, the touch panel 70a is also included in the operation unit 70.

A power supply control unit 81 includes, for example, a battery detecting circuit, a direct current (DC)-DC converter, and a switch circuit for switching a block to be supplied with power. The power supply control unit 81 detects whether or not a battery is attached, the type of the battery, and remaining battery capacity. In addition, the power supply control unit 81 controls, based on the detection result and an instruction from the system control unit 50, the DC-DC converter to supply necessary voltage to components including the recording medium 200 for necessary time period. A power source unit 30 includes a primary battery such as an alkaline battery and a lithium battery, a secondary battery such as a nickel-cadmium (NiCd) battery, a nickel-metal hydride (NiMH) battery, a lithium (Li) battery, and an alternating current (AC) adapter.

The recording medium 200 is a recording medium such as a memory card for recording a captured image. For example, the recording medium 200 is formed of a semiconductor memory, an optical disc, and magnetic disc.

Creative movie recording and display in the present exemplary embodiment will now be described. In the creative movie recording, a movie is recorded for a time length randomly set from among 3 to 6 seconds, and the recorded movie (chapter) is recorded with an effect being applied, thereby creating a series of movies (creation of a set of movies) constituting a set, from four chapters obtained through similar image capturing and recording. The chapter refers to a movie recorded according to one instruction from the user in the creative movie recording, and a set of movies reproduced as a series of movies is created by four chapters. In addition, once a recording instruction is received, the recording of each movie is ended in response to the lapse of the set recording time, even if a recording end instruction is not received. Four movies recorded as chapters include a movie recorded for a different recording time. In addition, different effects such as a slow motion effect, a quick motion effect, an image lag effect are applied to the respective movies to be recorded. In accordance with the application of these effects, a set of movies created by the creative movie recording include a chapter having a different reproduction time as compared with the other chapters. The four chapters are reproduced as a series of movies. The recording times of these chapters and the effect to be applied to each movie are determined for each movie corresponding to one chapter. Furthermore, a common effect may be similarly applied to the four recorded movies, in addition to the above-described effects. Hereinafter, two differences between the creative movie recording and automatic mode movie recording will be described.

As described above, in the creative movie recording, the digital camera 100 records movies only by the user issuing recording instructions of the movies at arbitrary timings. Furthermore, effects are applied to these movies, and the resultant movies are recorded as chapters. Then, a set of movies is created by combining or associating the plurality of movies. As a result, a set of movies unexpected by the user can be created. In the creative movie recording, a recording time is automatically set for each chapter, and recording automatically ends upon lapse of the set recording time. Thus, recording may end at a timing unexpected by the user. In addition, even if an elapsed time from the start of recording of a movie corresponding to one chapter is displayed, the user cannot identify when the recording of the movie under recording ends. Furthermore, the user cannot identify which part of the whole of a set of movies is currently being recorded. In addition, since a predetermined number of movies are recorded so as to create a series of movies constituting a set, the progress thereof needs to be conveyed to the user for prompting recording. Thus, in the present exemplary embodiment, the description will be given of display for identifying the progress with respect to the whole of the set of movies during recording or during recording standby, in the movie recording in the creative image capturing mode.

In addition, in one chapter of the creative movie recording, there is a period with any of the above-described slow motion effect, quick motion effect, image lag effect, and the like, and a period with no effect. The one chapter therefore includes various changes and effects that are visually identifiable. In the slow motion effect, a frame rate of a recorded movie is set to be low. In contrast, in the quick motion effect, a frame rate of a recorded movie is set to be high. In addition, the image lag effect is an effect of visualizing a residual image by superimposing the state of an object that is obtained a little while ago, onto the object being captured so that the object leaves the trail in an opposite direction to a moving direction of the object. Furthermore, possible effects to be applied to a movie are as follows: an effect of rotating an image at a predetermined speed by a predetermined angle; a color effect of changing an image color from a predetermined color to another predetermined color; and an effect of gradually changing a color tone of an image. Unlike capturing and recording of a movie in the automatic mode, in the creative image capturing mode, an effect that attracts user's attention is applied to the recorded movie to be recorded. For example, one chapter includes a period with the slow motion effect, a period with no effect, and a period with the image lag effect. In this manner, in the case of setting an effect simultaneously with the start of movie recording, and recording a movie while changing an effect to be applied, if the recording of the movie is interrupted, an effect to be applied to the movie recorded before the lapse of a set period is also interrupted. Thus, even when a period is set in such a manner that an effect interesting for the user is applied, if the recording is interrupted, a movie with strangeness (uncompleted chapter) may be generated. For example, even when the image lag effect is set to be applied for 2 seconds, only 0.3-second image lag effect may be applied. Thus, in the present exemplary embodiment, the description will be given of a configuration for preventing the user from casually issuing a recording end instruction in the creative shot movie recording.

The creative image capturing mode includes creative movie recording and creative still image capturing. In the creative still image capturing, a still image is captured according to an image capturing instruction from the user, and various effects are applied to the captured still image to be recorded. In the present exemplary embodiment, processing in the creative movie recording will be described.

<Creative Image Capturing Mode>

Figure 7A:
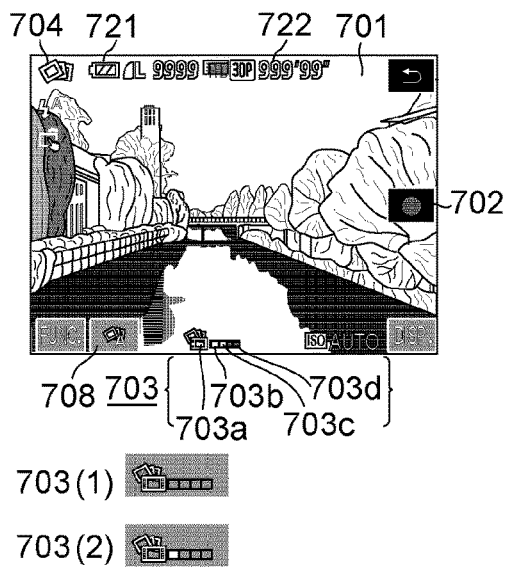
FIG. 7A is a diagram illustrating an example of a display unit during creative movie recording standby of the digital camera 100 according to the present exemplary embodiment.

The creative image capturing mode is set when the creative image capturing mode is selected via the mode selection switch 60. In addition, the creative image capturing mode can be set from a menu setting. FIG. 7A is a diagram illustrating an example of the display unit 28 during recording standby. A standby indicator 703 illustrated in FIG. 7A indicates a display example of an indicator obtainable after the end of recording up to the second movie among four movies. Among four sections consecutively displayed, first and second sections from left are displayed in white and the remaining two sections on the right side are displayed in gray. Through such display of the indicator (change in a display appearance), the user can visually recognize that the half of the entire image file, i.e., recording up to the second chapter has been finished (rate of the number of recorded movies). The standby indicator includes four sections. The respective sections corresponding to the movies of the first to the fourth chapters are arranged in a line in a recording order from left. Standby indicators 703 (1), 703 (2), and 703 (3) indicate display examples of the indicator 703 obtainable during standby before recording the first, the second, and the fourth chapters, respectively.

Figure 2A:
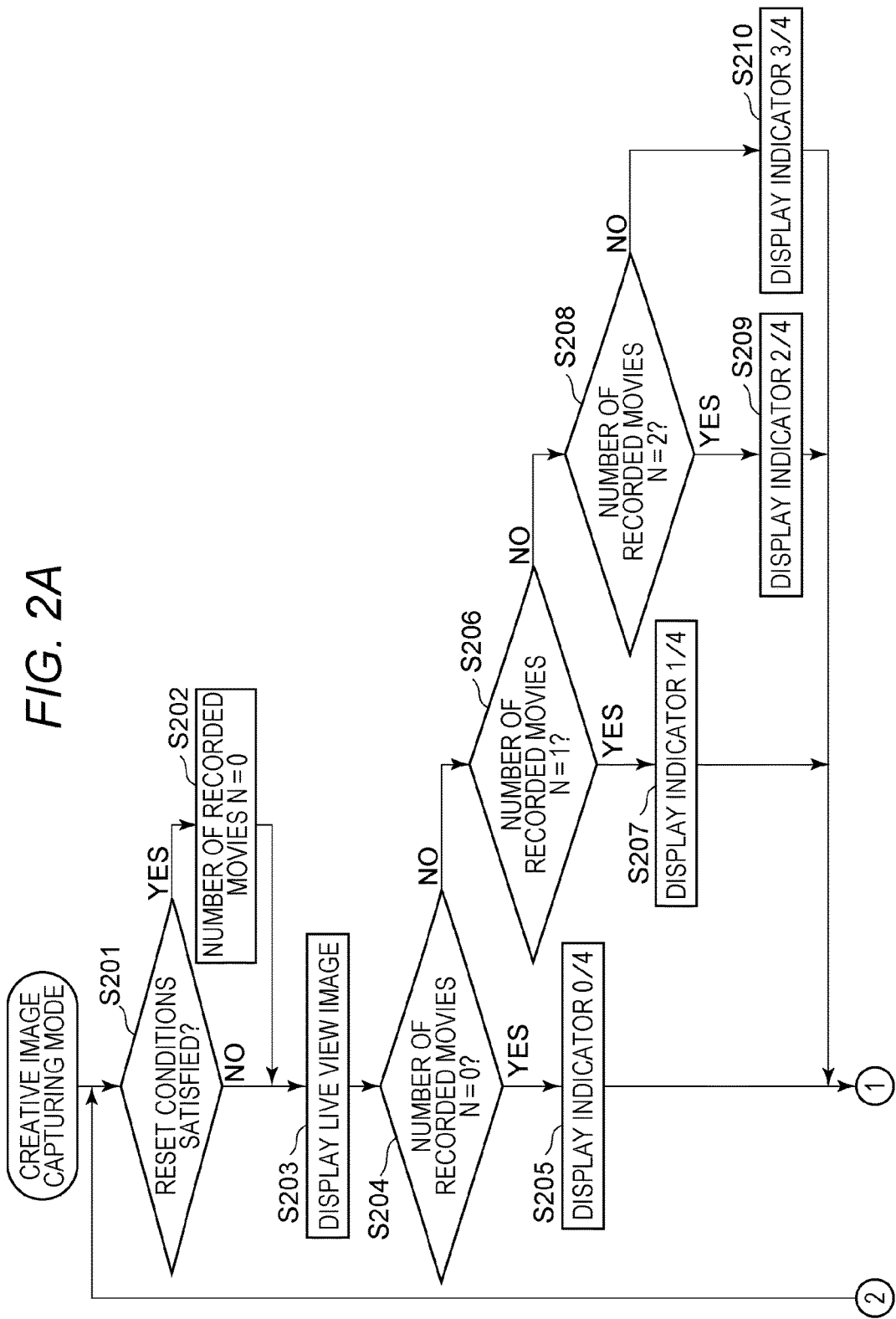
FIGS. 2A and 2B illustrate a flowchart in a creative image capturing mode of the digital camera according to the present exemplary embodiment.

Next, the flow of the creative image capturing mode in FIGS. 2A and 2B will be described using display examples illustrated in FIGS. 7A and 7C. When the creative image capturing mode is set, the creative image capturing mode illustrated in FIGS. 2A and 2B starts. The processing is realized by a program recorded in the nonvolatile memory 51 being loaded into the system memory 52 and executed by the system control unit 50.

In step S201, the system control unit 50 determines whether or not reset conditions of a set of movies are satisfied. If the system control unit 50 determines that the reset conditions are satisfied (YES in step S201), the processing proceeds to step S202. If the system control unit 50 determines that the reset conditions are not satisfied (NO in step S201), the processing proceeds to step S203. One of the reset conditions is that an uncompleted set of movies (the number of chapters included in a series of movies constituting a set is less than four) is not included in the recording medium 200. The other reset condition is that, in a case in which there is a chapter included in an uncompleted set of movies is included in the recording medium 200, the date on which the chapter is recorded differs from the date obtained at the start of the creative image capturing mode in step S201. In other words, the reset conditions are satisfied except in a case in which an uncompleted set of movies is included in the recording medium 200, and the date at the time of step S201 is the same as compared with a recording date and time of the first chapter of the uncompleted set of movies. In addition, even when a set of movies is being created, in a case in which a recording medium on which a chapter is to be recorded is changed from a recording medium including the set of movies to another recording medium (i.e., in a case in which the changed recording medium 200 does not include any uncompleted set of movies), the reset conditions are also satisfied.

In step S202, the system control unit 50 sets the number of recorded movies N to 0, and records the set number in the system memory 52. The number of recorded movies N is the number of chapters included in a series of movies constituting a set in the creative movie recording. In the present exemplary embodiment, when the number of recorded movies N becomes 4, the creation of a set of movies ends.

In step S203, the system control unit 50 displays a live view image 701 on the display unit 28. As illustrated in FIG. 7A, display related to shooting (display of display items) is provided on the display unit 28. For example, a creative movie mark 704, time display 722 of a shooting available time, a battery mark 721 indicating a remaining battery level, a shooting size, and a flash setting. In addition, if a category mark 708 indicating the category of the creative movie recording is touched, a plurality of categories of effects to be applied to a movie is displayed, so that the user can select the category of an effect. The category mark 708 illustrated in the drawing indicates an automatic category. Aside from the automatic category, the categories of effects include retro, monochrome, and natural.

In step S204, the system control unit 50 determines whether or not the number of recorded movies N is 0. If the system control unit 50 determines that the number of recorded movies N is 0 (YES in step S204), the processing proceeds to step S205. If the system control unit 50 determines that the number of recorded movies N is not 0 (NO in step S204), the processing proceeds to step S206.

In step S205, the system control unit 50 displays the standby indicator 703 (1) on the display unit 28. At this time, the system control unit 50 displays the standby indicator 703 (1) at the lower portion of the display unit 28 in such a size that an area overlapped with the display of the live view image 701 becomes small, and that respective display colors of the four sections of the indicator are recognizable. As a result, the user can read the sections of the indicator while viewing the live view image. In addition, during standby, it is often required to display setting items related to recording, such as the time display 722 and the battery mark 721. It is desirable to display the standby indicator 703 at such a position and in such a size that the user can recognize the standby indicator 703 and the display of the above-mentioned setting items, and the user does not feel difficulty in viewing the live view image. Furthermore, as illustrated in the standby indicator 703 (1) in FIG. 7A, all the four sections are displayed in gray. The portions (sections 703a to 703d of the standby indicator 703 (1)) displayed in gray indicate movies that have not been recorded yet. Thus, in a case in which all the sections are displayed in gray, it can be seen that a set of movies including a movie to be recorded include no recorded movie.

In step S206, the system control unit 50 determines whether or not the number of recorded movies N is 1. If the system control unit 50 determines that the number of recorded movies N is 1 (YES in step S206), the processing proceeds to step S207. If the system control unit 50 determines that the number of recorded movies N is not 1 (NO in step S206), the processing proceeds to step S208.

In step S207, the system control unit 50 displays a standby indicator 703 (2) on the display unit 28. Among the four sections of the standby indicator 703 (2), the first section 703a is displayed in white so as to indicate that the corresponding movie has been already recorded. At this time, the second to the fourth sections 703b to 703d remain to be displayed in gray, the display color being unchanged from that in step S205, so as to indicate that the corresponding movies have not been recorded yet.

In step S208, the system control unit 50 determines whether or not the number of recorded movies N is 2. If the system control unit 50 determines that the number of recorded movies N is 2 (YES in step S208), the processing proceeds to step S209. If the system control unit 50 determines that the number of recorded movies N is not 2 (NO in step S208), the processing proceeds to step S210.

In step S209, the system control unit 50 displays the standby indicator 703 on the display unit 28. Among the four sections of the standby indicator 703, the first and the second sections 703a and 703b are displayed in white so as to indicate that the corresponding movies have been already recorded. At this time, the third and the fourth sections 703c and 703d remain to be displayed in gray, the display color being unchanged from that in step S205, so as to indicate that the corresponding movies have not been recorded yet.

In step S210, the system control unit 50 displays a standby indicator 703 (3) on the display unit 28. Among the four sections of the standby indicator 703 (3), the first to the third sections 703a to 703c are displayed in white so as to indicate that the corresponding movies have been already recorded. At this time, the fourth section 703d remains to be displayed in gray, the display color being unchanged from that in step S205, so as to indicate that the corresponding movie has not been recorded yet.

In step S211, the system control unit 50 determines whether or not the power source unit 30 has capacity sufficient for recording one movie corresponding to one chapter, and the recording medium 200 has capacity sufficient for recording one chapter. In short, the system control unit 50 determines whether or not a movie corresponding to one chapter can be recorded. If the system control unit 50 determines that a movie corresponding to one chapter can be recorded (YES in step S211), the processing proceeds to step S216. If the system control unit 50 determines that a movie corresponding to one chapter cannot be recorded (NO in step S211), the processing proceeds to step S212. It is only required that the power source unit 30 has battery capacity sufficient for recording one movie corresponding to one chapter, and the recording medium 200 has capacity sufficient for recording a movie corresponding to one chapter with an effect. In the present exemplary embodiment, a recording time for recording a movie corresponding to one chapter is not fixed, and is selected from among 3, 4, and 6 seconds. Thus, in this step, the system control unit 50 determines whether or not the power source unit 30 has battery capacity sufficient for 6-second movie recording and processing of applying an effect thereto. In the present exemplary embodiment, the maximum length of a recording time of a movie to be recorded as one chapter is 6 seconds. It is therefore determined that the battery capacity corresponding to 6 seconds is sufficient for any of recording times that are to be possibly set.

Figure 7B:
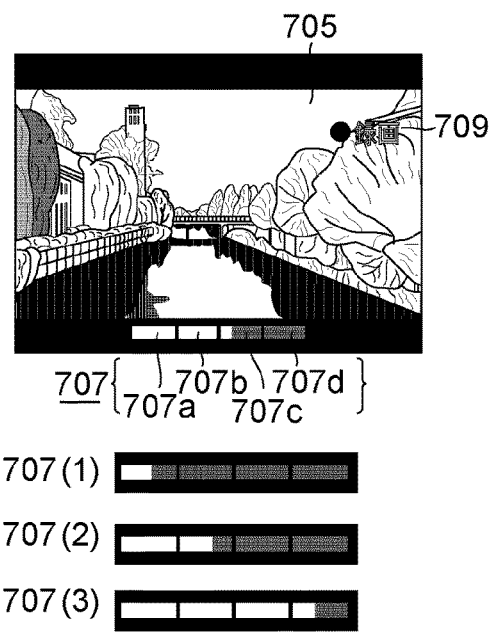
FIG. 7B is a diagram illustrating an example of a display unit during creative movie recording of the digital camera 100 according to the present exemplary embodiment.
Figure 7C:
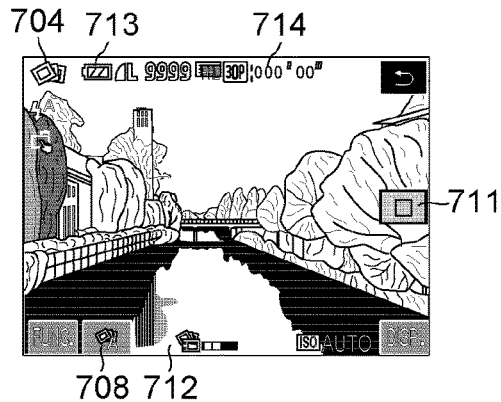
FIG. 7C is a diagram illustrating an example of a display unit of a case in which image capturing by the digital camera 100 according to the present exemplary embodiment is not available.

In step S212, as illustrated in FIG. 7C, the system control unit 50 displays a movie recording graphical user interface (GUI) button 711 in a grayout state, or hides the movie recording GUI button 711, so as to disable reception of an instruction of creative movie recording. FIG. 7C illustrates an example of the display unit 28 during recording standby indicating that creative movie recording cannot be performed.

In step S213, as indicated by an indicator 712 in FIG. 7C, the system control unit 50 displays sections of the standby indicator that correspond to not-recorded movies (movies that have not recorded yet among four movies) in a blackout state (displays in black) so as to indicate that the next movie cannot be recorded. At this time, as in the indicator 712, when two sections among the four sections are displayed in white and the remaining two sections are in the blackout state, it is indicated that movies corresponding to two chapters have not been recorded yet. The sections indicating the chapters corresponding to not-recorded movies are displayed in gray again once the creative movie recording is enabled. In addition, if it is determined in S211 that a movie corresponding to one chapter cannot be recorded (NO in step S211), a shooting available time may be displayed as 0 second, as in time display 714. Furthermore, if the capacity of the power source unit 30 is not sufficient, battery capacity may be displayed in a black-filled manner as in a battery mark 713 so as to notify the user that battery runs out. By checking these kinds of display, the user can make preparation so that creating movie recording can be performed again.

In step S214, the system control unit 50 determines whether or not the second shutter switch 63 has been pressed after the press of the first shutter switch 62 by operating the shutter button 61. If the system control unit 50 determines that the second shutter switch 63 has been pressed (YES in step S214), the processing proceeds to step S215. If the system control unit 50 determines that the second shutter switch 63 has not been pressed (NO in step S214), the processing returns to step S201.

In step S215, the system control unit 50 performs a creative still image process. Still image capturing will be described in a still image capturing process (FIG. 3C).

In step S216, as illustrated in FIG. 7A, the system control unit 50 displays a movie recording GUI button 702 on the display unit 28. The movie recording GUI button 702 is a GUI button displayed on the display unit 28, and for starting movie recording in response to a corresponding region on the touch panel 70a being pressed. In FIG. 7A, the whole battery capacity of the battery mark 721 is displayed in white, indicating that the battery capacity is almost full. In the creative movie recording, it is only required that battery capacity is sufficient for recording a movie corresponding to one chapter. Thus, the battery mark display indicating battery capacity does not always indicates full battery.

In step S217, the system control unit 50 determines whether or not the movie recording GUI button 702 as illustrated in FIG. 7A has been pressed (touched). If a touch operation is performed on a corresponding region on the touch panel 70a corresponding to the display unit 28, the movie recording GUI button 702 is determined to be pressed. If the system control unit 50 determines that the movie recording GUI button 702 has been pressed (YES in step S217), the processing proceeds to step S218. If the system control unit 50 determines that the movie recording GUI button 702 has not been pressed (NO in step S217), the processing returns to step S214. In other words, the system control unit 50 waits until the second shutter switch 63 or the movie recording GUI button 702 is pressed. At this time, the digital camera 100 may enter a sleep mode in response to lapse of a power saving start time.

In step S218, the system control unit 50 performs a creative movie process. The creative movie recording will be described below with reference to FIG. 4.

<Automatic Mode>

Next, the flow of the automatic mode in FIGS. 3A to 3C will be described with reference to FIG. 7D.

Figure 3A:
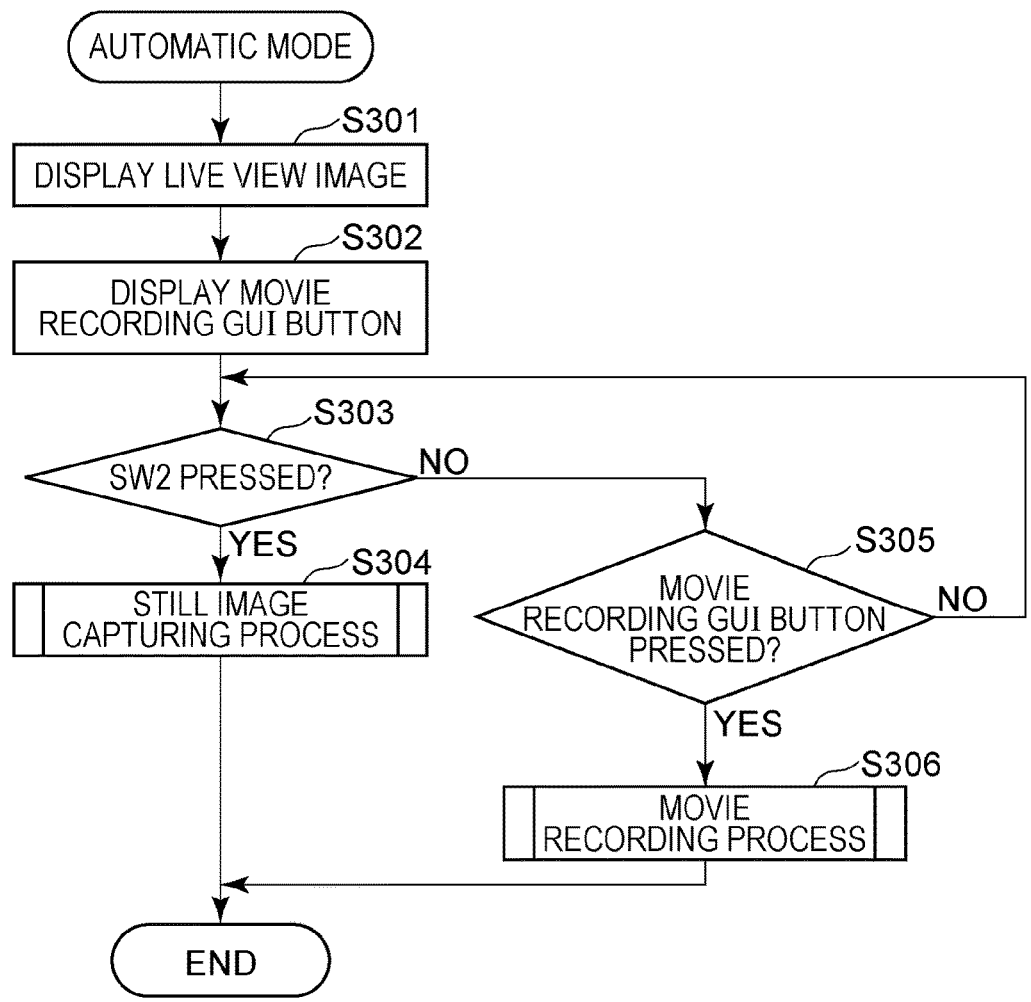
FIG. 3A illustrates a flowchart in an automatic mode of a digital camera 100 according to the present exemplary embodiment.
Figure 3B:
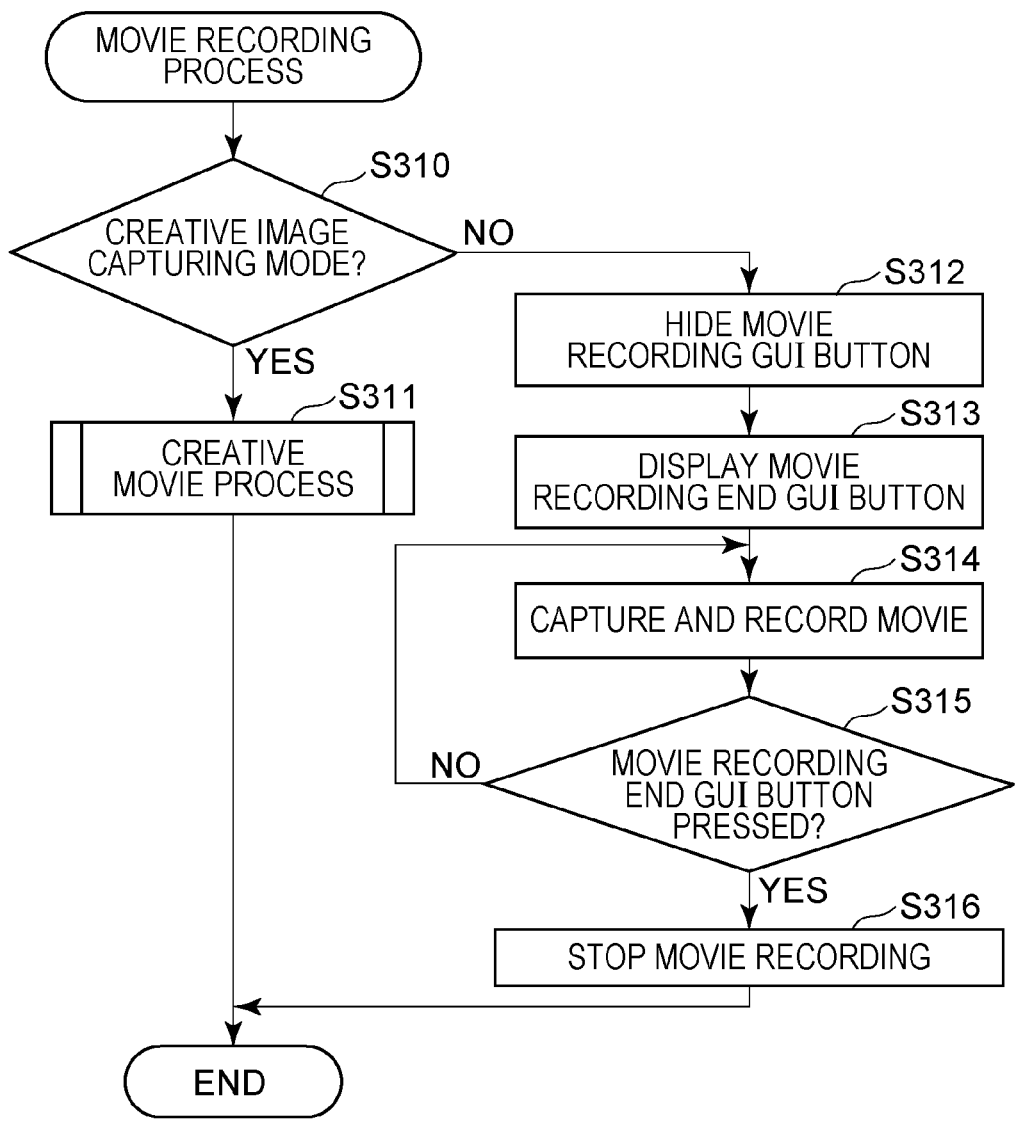
FIG. 3B illustrates a flowchart indicating a movie recording process of the digital camera 100 according to the present exemplary embodiment.
Figure 3C:
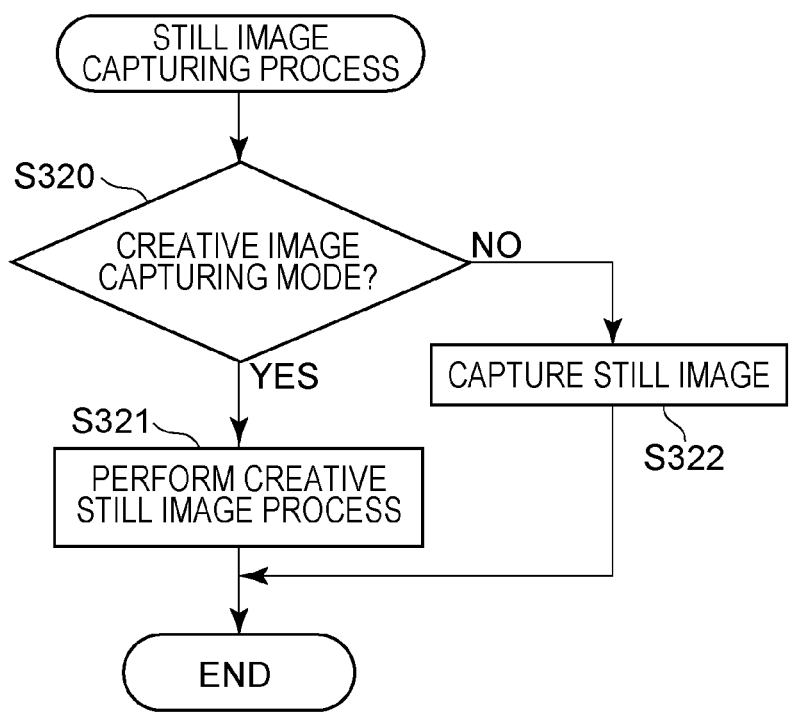
FIG. 3C illustrates a flowchart indicating a still image capturing process of the digital camera 100 according to the present exemplary embodiment.

FIG. 3A illustrates a process flow of a normal shooting mode (an automatic mode as an example). This process is achieved by loading a program recorded on the nonvolatile memory 51 into the system memory 52 and the system control unit 50 executing the program. FIG. 7D illustrates an example of the display unit 28 during recording standby in the automatic mode.

Figure 7D:
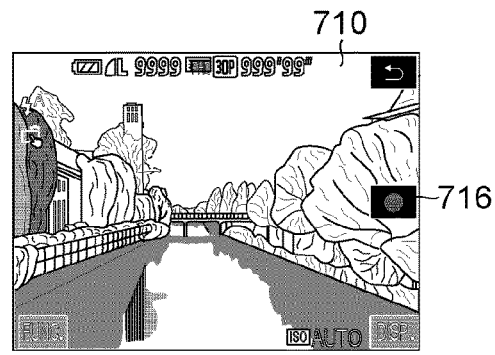
FIG. 7D is a diagram illustrating an example of a display unit during movie recording standby in an automatic mode of the digital camera 100 according to the present exemplary embodiment.

In step S301, the system control unit 50 displays, on the display unit 28, a live view image 710 as illustrated in FIG. 7D.

Figure 2B:
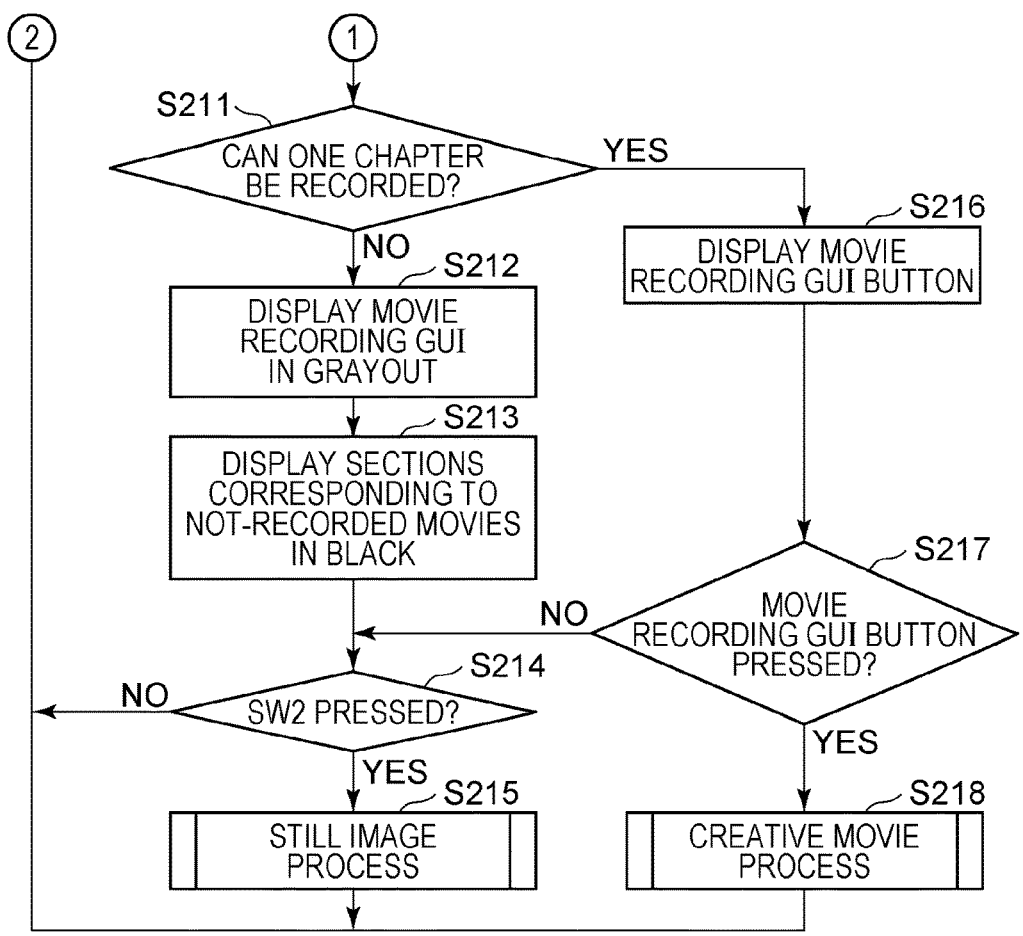

In step S302, similarly to step S216 in FIG. 2B, the system control unit 50 displays a movie recording GUI button 716 as illustrated in FIG. 7D.

In step S303, the system control unit 50 determines whether or not the second shutter switch 63 has been pressed by the operation of the shutter button 61 (physical button). If the system control unit 50 determines that the second shutter switch 63 has been pressed (YES in step S303), the processing proceeds to step S304. If the system control unit 50 determines that the second shutter switch 63 has not been pressed (NO in step S303), the processing proceeds to step S305.

In step S304, the system control unit 50 performs a still image capturing process. The still image capturing process will be described below with reference to the flow illustrated in FIG. 3C.

In step S305, the system control unit 50 determines whether or not the movie recording GUI button 716 has been pressed (touched). If the system control unit 50 determines that the movie recording GUI button 716 has been pressed (YES in step S305), the processing proceeds to step S306. If the system control unit 50 determines that the movie recording GUI button 716 has not been pressed (NO in step S305), the processing returns to step S303. In this manner, the system control unit 50 waits until the second shutter switch 63 or the movie recording GUI button 716 is pressed.

In step S306, the system control unit 50 performs a movie recording process. The movie recording process will be described below with reference to the flow illustrated in FIG. 3B.

Figure 7E:
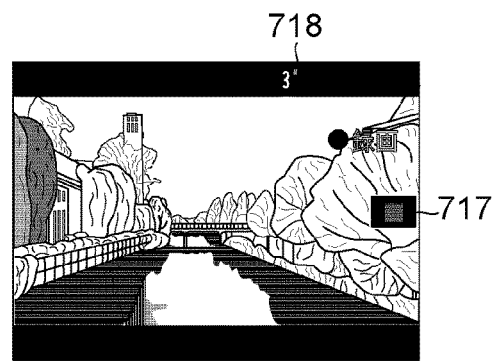
FIG. 7E is a diagram illustrating an example of a display unit during movie recording in an automatic mode of the digital camera 100 according to the present exemplary embodiment.

Next, the flow of the movie recording process illustrated in FIG. 3B will be described with reference to FIGS. 7D and 7E. FIG. 7E illustrates an example of the display unit 28 during recording in the automatic mode. In addition, FIG. 3B illustrates the flow of the movie recording process, and illustrates the detailed flow of the movie recording process in step S306 in FIG. 3A.

In step S310, the system control unit 50 determines whether or not the creative image capturing mode is set as a shooting mode setting of the digital camera 100. If the system control unit 50 determines that the creative image capturing mode is set (YES in step S310), the processing proceeds to step S311. If the system control unit 50 determines that the creative image capturing mode is not set (NO in step S310), the processing proceeds to step S312.

In step S311, the system control unit 50 performs a creative movie process. The creative movie process will be described with reference to the flow illustrated in FIG. 4.

If it is determined in step S310 that the creative image capturing mode is not set (NO in step S310), the following recording process is performed. The flow of the process performed in such a case will be described as an automatic mode (a mode in which, unlike the creative movie process, recording is started and ended both according to a user instruction, and a recorded movie is recorded without an effect being applied). In addition, in the present exemplary embodiment, a shooting mode is described as either of the automatic mode and the creative image capturing mode, which will be described below. The shooting mode, however, is not limited to these modes, and other shooting modes may be provided.

In step S312, the system control unit 50 hides the movie recording GUI button 716 that had been displayed during recording standby.

In step S313, the system control unit 50 displays a movie recording end GUI button 717 on the display unit 28. The recording of a movie is started in response to the movie recording GUI button 716 being pressed, whereas the recording of the movie is ended in response to the movie recording end GUI button 717 being pressed. By displaying the movie recording end GUI button 717 in the same size and in the same display region as the movie recording GUI button 716, the user can issue a recording end instruction by performing a touch operation on the same position as the position where a recording start instruction is issued.

In step S314, the system control unit 50 records image data obtained by the imaging unit 103 and converted into digital data by the A/D converter 15, onto the recording medium 200 as a movie file 805 as illustrated in FIG. 8B. In the movie recording in the automatic mode, an effect is not applied to a recorded movie, and the recorded movie is directly recorded for a recorded time. In addition, the movie recording in the automatic mode, a recording time 718 is displayed so as to indicate how many seconds have elapsed from the start of movie recording (elapsed time from recording start). Thus, the user can end the recording after confirming that a desired recording time has elapsed.

In step S315, the system control unit 50 determines whether or not the movie recording end GUI button 717 has been pressed (touched). If the system control unit 50 determines that the movie recording end GUI button 717 has been pressed (YES in step S315), the processing proceeds to step S316. If the system control unit 50 determines that the movie recording end GUI button 717 has not been pressed (NO in step S315), the processing returns to step S314.

In step S316, the system control unit 50 stops recording the image data obtained by the imaging unit 103 and converted into digital data by the A/D converter 15, onto the recording medium 200 as a movie. If the movie recording is stopped, the movie recording end GUI button 717 is hidden again, and the movie recording GUI button 716 is displayed.

Next, the flow of the still image capturing process illustrated in FIG. 3C will be described. FIG. 3C illustrates the flow of the still image capturing process.

In step S320, the system control unit 50 determines whether or not the creative image capturing mode is set in the digital camera 100. If the system control unit 50 determines that the creative image capturing mode is set (YES in step S320), the processing proceeds to step S321. If the system control unit 50 determines that the creative image capturing mode is not set (NO in step S320), the processing proceeds to step S322.

In step S321, the system control unit 50 performs a creative still image process. In the creative still image process, a still image is captured, the still image is edited and adjusted by applying an effect (e.g., an effect of changing the color of an object, and an effect of changing the composition of an object), and then the resultant still image is recorded.

In step S322, the system control unit 50 performs still image capturing in the automatic mode.

In this manner, in the present exemplary embodiment, if the movie recording GUI button 716 on the touch panel 70a is pressed, movie recording is started. Meanwhile, if the second shutter switch 63 is pressed, still image capturing is started. In addition, by determining whether or not the creative image capturing mode is set, image capturing is performed in the automatic mode or the creative image capturing mode.

<Creative Movie Process>

Figure 4:
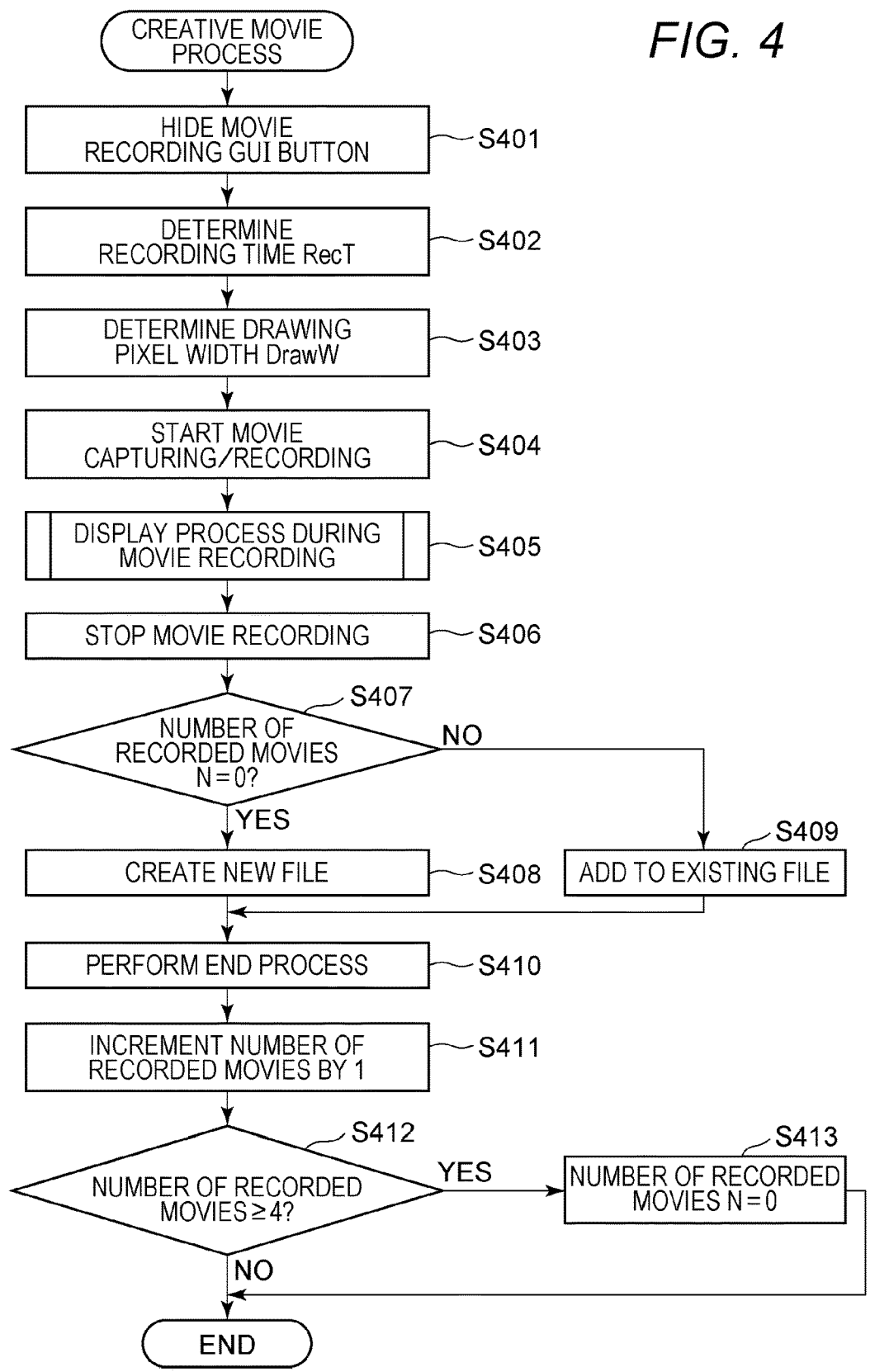
FIG. 4 illustrates a flowchart indicating a creative movie process of the digital camera 100 according to the present exemplary embodiment.
Figure 5A:
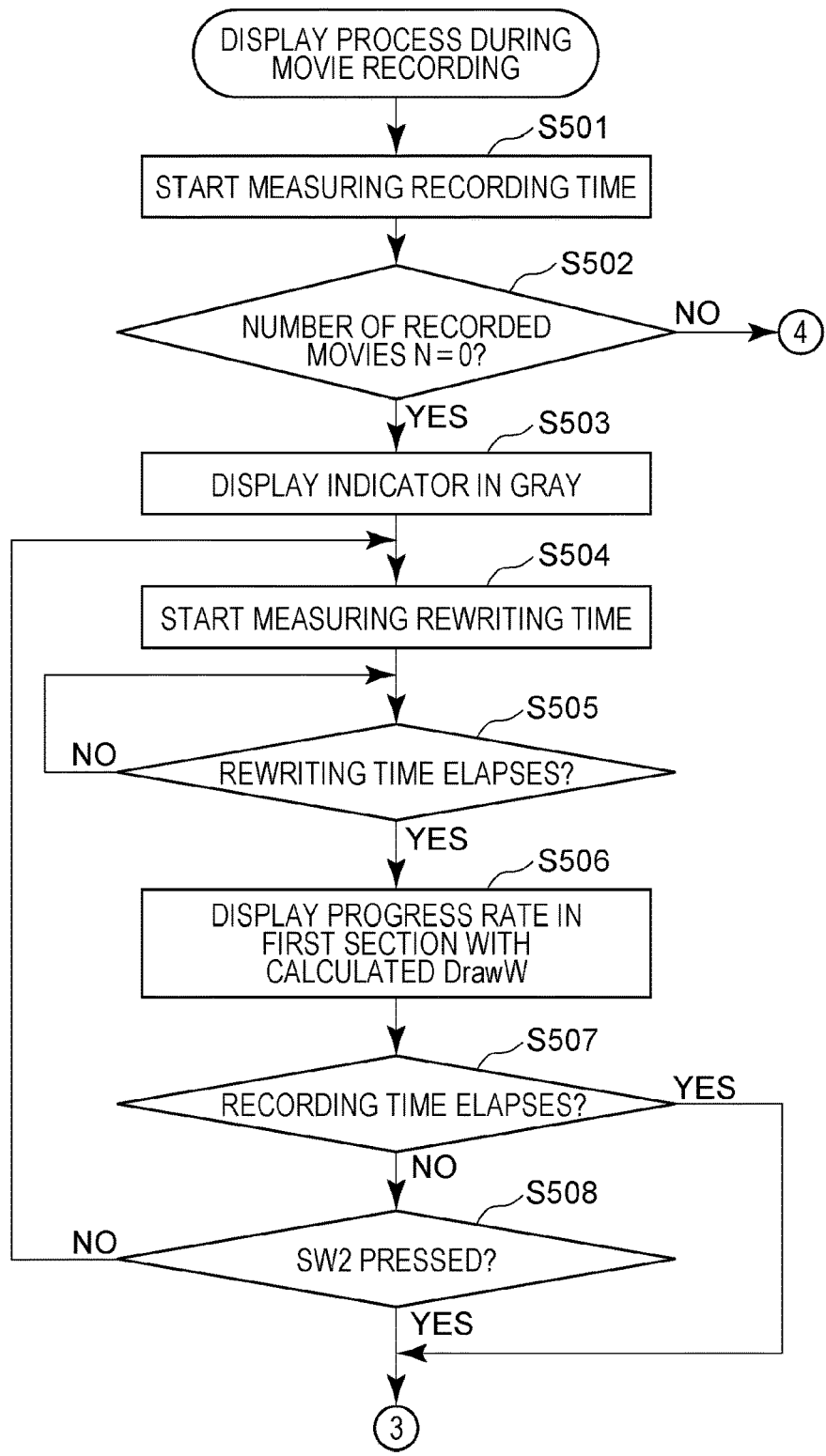
FIGS. 5A to 5D illustrate a flowchart indicating a display process during movie recording in creative movie recording of the digital camera 100 according to the present exemplary embodiment.
Figure 5B:
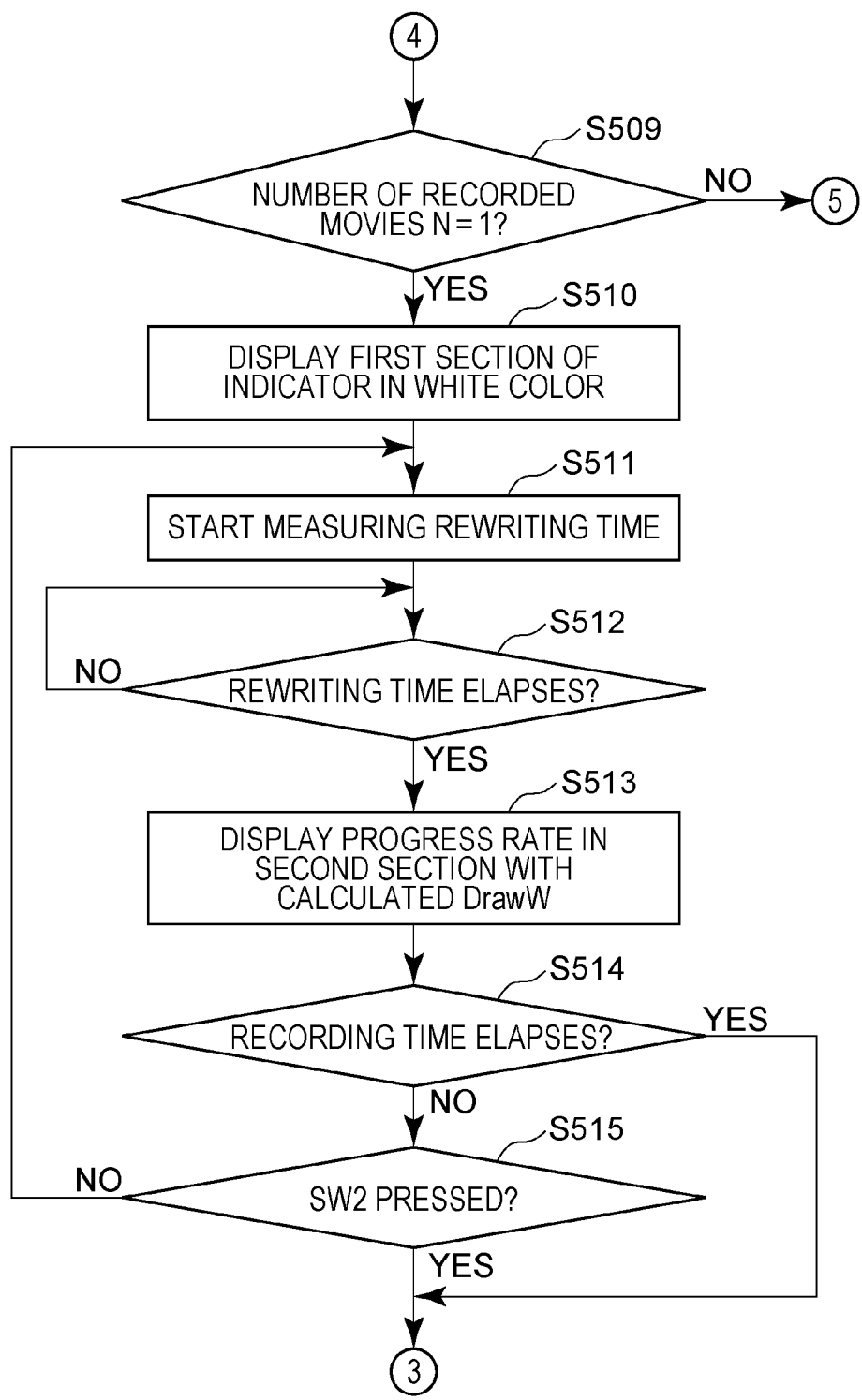
Figure 5C:
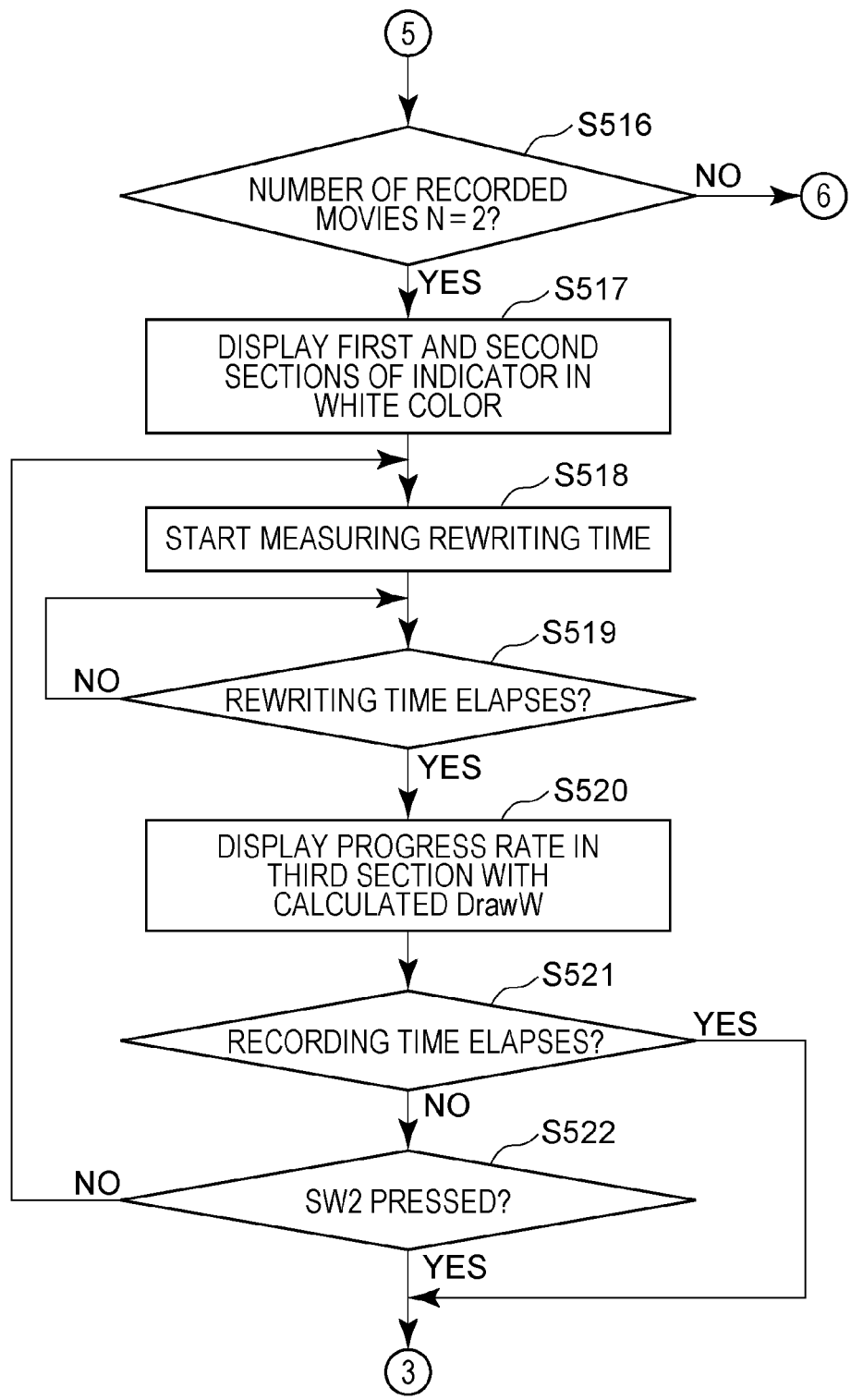
Figure 5D:
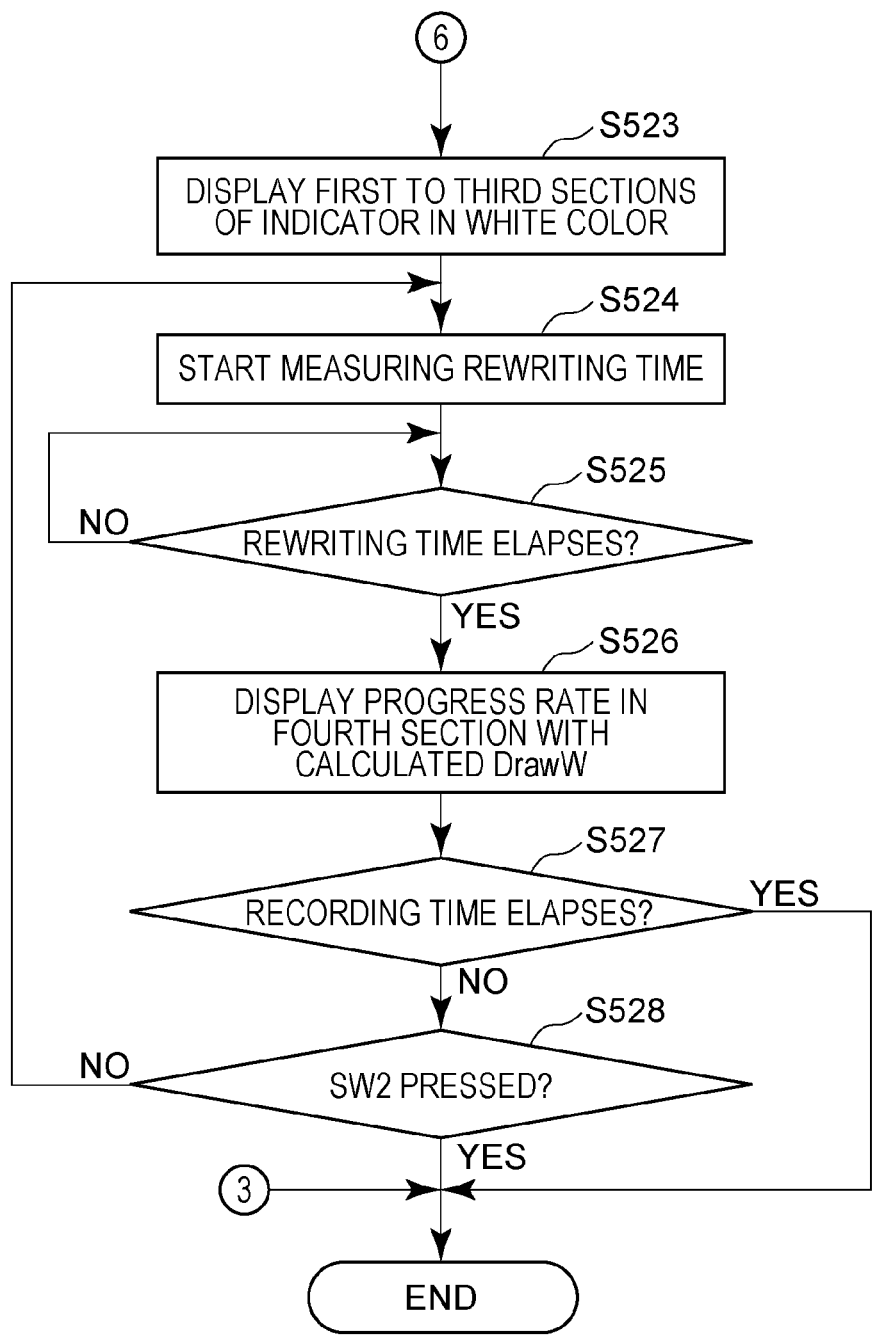

Next, the flow of the creative movie process illustrated in FIG. 4 will be described with reference to FIGS. 6A to 6C, and 7B. This process is achieved by loading a program recorded on the nonvolatile memory 51 into the system memory 52 and the system control unit 50 executing the program.

In step S401, the movie recording GUI button 702 displayed on the display unit 28 is hidden. If the movie recording GUI button 702 is hidden, as illustrated in FIG. 7B, in a region in which the movie recording GUI button 702 had been displayed, a part of a live view image 705 is displayed. In the creative image capturing mode, after the movie recording GUI button 702 is hidden, unlike the automatic mode, the movie recording end GUI button is not displayed, and a movie recording end instruction according to a touch operation is not received. In the movie recording in the creative image capturing mode, a period corresponding to a part of the set recording time, and an effect to be applied to a movie recorded during the period are set. Thus, if the recording is ended before the lapse of the set recording time, a movie with a halfway effect may be generated. In addition, during movie recording in the creative image capturing mode, an image with a corresponding effect is not displayed on the display unit 28. The user therefore cannot recognize what type of effect is applied to a movie which is under recording before being recorded. Thus, if a start instruction and an end instruction of a movie can be issued by the same operation as in the automatic mode, it may be determined that recording can be ended at any timing, and movie recording may be casually ended in the judgment of the user. For this reason, a movie recording end instruction is not received according to a touch operation. With this configuration, creative movie recording can be performed for the preset recording time without being casually stopped by the user, and a chapter with an effect being applied for the set period can be obtained.

In step S402, the system control unit 50 determines a recording time RecT. In the present exemplary embodiment, the recording time RecT is determined by being selected from among 3, 4, and 6 seconds. The recording time RecT is determined according to an effect to be applied to a movie. In the present exemplary embodiment, while a recording time of each movie is 3 to 6 seconds, a reproduction time of each movie is set to be 4 to 7 seconds. The recording time of a movie is set so that a reproduction time obtainable after each effect is applied to the movie falls within the range of 4 to 7 seconds.

In step S403, the system control unit 50 determines a drawing pixel width DrawW of a shooting-in-progress indicator. A shooting-in-progress indicator 707 illustrated in FIG. 7B includes four sections, and the respective sections corresponding to the first to the fourth movies are arranged in order from left. Each section is displayed in gray if a corresponding chapter has not been recorded yet, and displayed in white if the corresponding chapter has already been recorded. If the recording of the chapter progresses, the display color of each section switches from gray to white starting from the first section to the four section in order from left, thereby indicating a progress rate of movie recording (progress rate display). In this manner, the chapter corresponding to a not-recorded movie is displayed in gray while the chapter corresponding to a recorded image is displayed in white, similarly to the standby indicator.

Figure 6A:
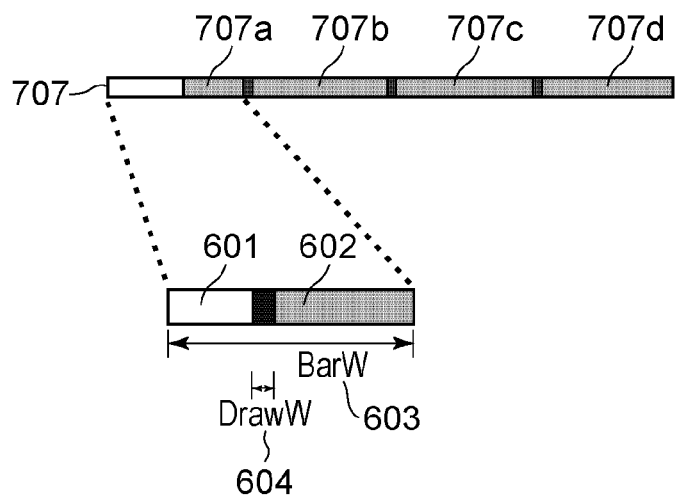
FIGS. 6A to 6C are diagrams illustrating indicator display in creative movie recording of the digital camera 100 according to the present exemplary embodiment.
Figure 6B:
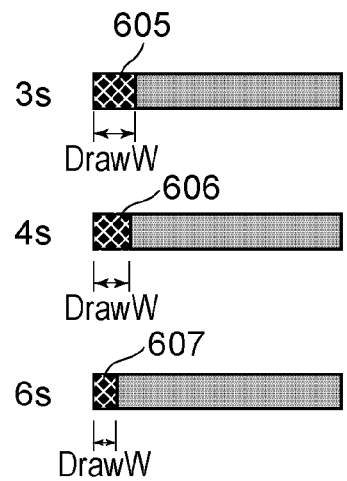
Figure 6C:
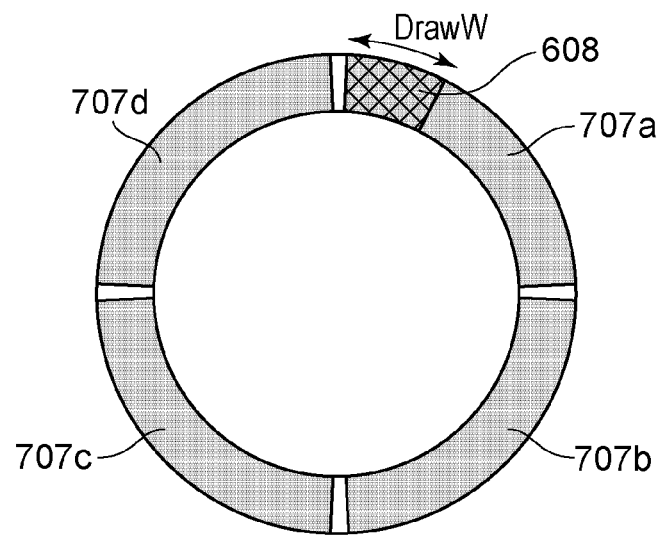

The display of the shooting-in-progress indicator will now be described with reference to FIGS. 6A to 6C. FIG. 6A is a diagram for illustrating a section width BarW and a drawing pixel width DrawW of the indicator displayed during recording. FIG. 6B is a diagram for further illustrating a drawing pixel width DrawW for each recording time. A section width BarW 603 illustrated in FIG. 6A is equal to the length of one section, and indicates the entire recording time of one chapter (a movie recorded according to one recording instruction). The display length does not vary according to a recording time. In addition, the section width BarW 603 illustrates, in an enlarged manner for explanation, one section of the shooting-in-progress indicator 707 illustrated in FIG. 7B that indicates the progress during recording. In other words, the length of the section width BarW 603 remains the same regardless of whether a recording time is 3, 4, or 6 seconds. In addition, a white portion 601 indicates the rate of the length of a recording time of a recorded portion of a movie corresponding to one chapter. In contrast, a gray portion 602 indicates the rate of the length of a recording time of a not-recorded portion. A drawing pixel width DrawW 604 indicates a drawing pixel width of a portion the display color of which is switched (recolored) from gray to white by one update of indicator display. During recording, display in one section of the indicator is updated in accordance with the progress of recording, so as to indicate that recording in a predetermined period (rewriting time Tα) is completed. The rewriting time Tα is a reciprocal of a frame rate DrawF. In the present exemplary embodiment, switching of the color of the indicator from gray to white indicates that recording has accordingly progressed. In other words, as recording progresses, the display color of each section of the indicator, which had been displayed entirely in gray at the start of recording, switches from gray to white starting from the left side in each recording period, at a progress rate corresponding to a set recording time. Through such display, the user can recognize the progress of the recording. In addition, when the recording ends, one section displayed in gray at the start of recording is displayed entirely in white. Thus, based on the change in display color, the user can recognize that recording corresponding to one chapter is ended, in addition to the progress of the recording.

In addition, the drawing pixel width DrawW, which is a width in which the display progresses through one drawing (the display indicating the progress rate is changed) can be obtained by the following formula:

$$DrawW = BarW/(RecT*DrawF)$$

The frame rate DrawF indicates the number of updates of drawing performed on the display unit 28 per unit time (1 second). The value of the frame rate DrawF depends on the display unit 28, the system control unit 50, or the like. Accordingly, since the section width BarW and the frame rate DrawF have values that do not change according to each chapter of a movie, it can be seen that the width of the drawing pixel width DrawW varies for each section only according to the length of the recording time RecT. Drawing pixel widths for the respective recording times illustrated in FIG. 6B include a drawing pixel width DrawW 605 of a case in which a recording time is 3 seconds, a drawing pixel width DrawW 606 of a case in which a recording time is 4 seconds, and a drawing pixel width DrawW 607 of a case in which a recording time is 6 seconds. When these drawing pixel widths are compared, it can be seen that, as the value of the recording time RecT increases, the width of the drawing pixel width DrawW becomes narrower, whereas as the value of the recording time RecT decreases, the width of the drawing pixel width DrawW becomes wider. In other words, as the recording time becomes longer, the progress of the progress rate becomes slower, whereas as the recording time becomes shorter, the progress of the progress rate becomes faster. The progress in the recording of a movie corresponding to one chapter can be visually recognized. In addition, in any of the lengths of the recording times, the drawing of the progress rate ends upon the lapse of the determined recording time of a movie.

In step S404, the system control unit 50 starts movie recording, and the recorded movie with an effect being applied is recorded onto the recording medium 200 in parallel with the progress of the movie recording. An effect to be applied to each movie is randomly selected from among slow motion/quick motion/image lag effects. The type of an effect applied to a movie which is under recording is not displayed during recording of the movie. Furthermore, in response to the start of the movie recording of the first chapter, an effect to be applied to all of the four chapters is selected from color filter/brightness combination, aside from slow motion/quick motion/image lag effects.

In step S405, the system control unit 50 performs a display process during movie recording. The display process during movie recording will be described below with reference to FIGS. 5A to 5D.

In step S406, the system control unit 50 stops movie recording. In the creative movie recording, the start of movie recording is instructed by the user, and the movie recording is automatically stopped after the lapse of a randomly set recording time. Nevertheless, in the creative movie recording, although a movie recording end instruction is not received on the touch panel 70a, movie recording can be ended by the press of the second shutter switch 63. In movie recording in the automatic mode, a start instruction and an end instruction of movie recording can be issued by touch operations performed on the button on the touch panel 70a. In contrast, in the creative movie recording, a start instruction and an end instruction of movie recording issued on the same instruction unit are not received. In this manner, in the creative movie recording, a button for instructing movie recording end is not displayed, thereby preventing the user from casually ending the movie recording.

In step S407, the system control unit 50 determines whether or not the number of recorded movies N is 0. If the system control unit 50 determines that the number of recorded movies N is 0 (YES in step S407), the processing proceeds to step S408. If the system control unit 50 determines that the number of recorded movies N is not 0 (NO in step S407), the processing proceeds to step S409.

In step S408, the system control unit 50 creates a new movie file on the recording medium 200, and records the latest chapter recorded in the process of step S404 as part of the created movie file. FIGS. 8A and 8B illustrate recording formats of movies recorded on the recording medium 200. FIGS. 8A-1 and 8A-2 illustrate recording formats of a series of movies constituting a set in the creative movie recording.

FIG. 8B illustrates a recording format of a movie in movie recording in the automatic mode. FIG. 8A-1 illustrates a recording format of a case in which four chapters are arranged in order in a single created movie file 801, whereby a series of movies constituting a set is created. In the present exemplary embodiment, the description will be given assuming that a series of movies constituting a set is recorded as a single movie file. Nevertheless, movies obtained through a series of recordings may not be recorded as a single movie file. For example, a series of movies constituting a set may be created in the following manner. As illustrated in FIG. 8A-2, the movies are recorded on the recording medium 200 as separate movie files, and the same attribute information (set information 802) is added to these movies, whereby a set of movies is created. In this manner, when a movie corresponding to a chapter is created as a movie file, in step S408, a movie recorded with new set information 802 being added is recorded as a movie file. When four movie files (chapters) having the same set information 802 are recorded on the recording medium 200, a series of movies constituting a set is completed (the four movie files can be reproduced as a series of movies). As another alternative, the following case is also included. Information that can associate a plurality of obtained movies with one another may be added to the plurality of movies so as to form a set of movies later. In this case, the plurality of movies is reproduced or connected as a set of movies actually by an application or software. The set of movies, however, are assumed to be created by a creation unit that has recorded the plurality of movies in association with one another.

In step S409, the system control unit 50 arranges (records) the latest movie recorded in step S404, into the existing movie file 801 on the recording medium 200.

In step S410, the system control unit 50 performs an end process. In the end process, a compression process of a recorded movie, creation of a thumbnail, and the like are performed, and the processed movie and the created thumbnail are recorded together with a recording date and time. As illustrated in FIG. 8A-1, the first to the fourth chapters are recorded in order (recording-controlled so as to be connected) in the movie file 801, thereby creating a movie file. In addition, in a case in which a series of movies constituting a set is created by adding the same set information, a file name and file identification data (ID) of each movie, and set information of a series of movies including the corresponding movie are added in this step, a compression process of the movie and creation of a thumbnail are performed, and the processed movie and the created thumbnail are recorded together with a recording date and time. Based on the information such as the set information 802, a movie file ID 804, and the recording date and time that are recorded here, an order such as the order in which the four chapters are recorded (in which order the four chapters are to be reproduced) is identified.

In step S411, the system control unit 50 increments the number of recorded movies N by 1, and records the obtained number of recorded movies N into the system memory 52.

In step S412, the system control unit 50 determines whether or not the number of recorded movies N is equal to or larger than 4. If the system control unit 50 determines that the number of recorded movies N is equal to or larger than 4 (YES in step S412), the processing proceeds to step S413. If the system control unit 50 determines that the number of recorded movies N less than 4 (NO in step S412), the creative movie process is ended.

In step S413, the system control unit 50 sets the number of recorded movies N to 0. As a series of movies constituting a set includes four movies, every time four movies included in a series of movies constituting a set are recorded, the value of the number of recorded movies N is set to 0.

<Display Process During Movie Recording>

Next, the flow of the display process during movie recording illustrated in FIGS. 5A to 5D will be described with reference to FIG. 7B. FIGS. 5A to 5D illustrate a flowchart indicating the display process during movie recording in step S405 in FIG. 4, and illustrate the flow of a process during recording (after the press of the movie recording GUI button 702 until the lapse of the recording time). FIG. 7B illustrates an example of the display unit 28 during recording. The shooting-in-progress indicator 707 illustrated in FIG. 7B indicates a display example of the indicator obtainable after the end of recording up to the second movie among four movies. Shooting-in-progress indicators 707 (1), 707 (2), and 707 (3) illustrated below the live view image 705 indicate display examples of the shooting-in-progress indicator during the recording of the first chapter, the second chapter, and the fourth chapter, respectively.

In step S501, the system control unit 50 causes the system timer 53 to start measuring a recording time.

In step S502, the system control unit 50 determines whether or not the number of recorded movies N is 0. If the system control unit 50 determines that the number of recorded movies N is 0 (YES in step S502), the processing proceeds to step S503. If the system control unit 50 determines that the number of recorded movies N is not 0 (NO in step S502), the processing proceeds to step S509.

In step S503, the system control unit 50 displays the shooting-in-progress indicator 707 in which all the sections are displayed in gray. As illustrated in the shooting-in-progress indicator 707 in FIG. 7B, the shooting-in-progress indicator 707 is displayed in a larger display size, and displayed to have a longer display width of each section as compared with the standby indicator 703, so that a portion inside each section can be clearly seen. In other words, the standby indicator 703 is displayed with smaller-sized sections (small sections) than those of the shooting-in-progress indicator 707. The widths of the respective sections are equal. The respective sections correspond to the recording statuses (the progresses of the recordings, and the states indicating whether or not the corresponding movies have been already recorded) of movies of the first chapter, the second chapter, the third chapter, and the fourth chapter in order from the left. If the four sections are displayed in gray and there is no section displayed in white, it can be seen that there is no recorded movie, and such a state indicates being at the start of recording of the first movie.

In step S504, the system control unit 50 causes the system timer 53 to start measuring a rewriting time.

In step S505, the system control unit 50 determines whether or not a rewriting time Tα has elapsed from the latest measurement start of the rewriting time in step S504. If the system control unit 50 determines that the rewriting time Tα has elapsed (YES in step S505), the processing proceeds to step S506. If the system control unit 50 determines that the rewriting time Tα has not elapsed (NO in step S505), the system control unit 50 keeps waiting until the rewriting time Tα elapses.

In step S506, as illustrated in a shooting-in-progress indicator 707 (1), the system control unit 50 displays (switches the display color to white) a progress rate according to the elapsed time from the recording start, in the first section 707a among the four sections with the drawing pixel width DrawW calculated in step S403.

In step S507, the system control unit 50 determines whether or not the recording time RecT set in step S402 has elapsed from the measurement start of the recording time in step S501. If the system control unit 50 determines that the recording time RecT has elapsed (YES in step S507), the movie recording is ended. If the system control unit 50 determines that the recording time RecT has not elapsed (NO in step S507), the processing proceeds to step S508.

In step S508, the system control unit 50 determines whether or not the second shutter switch 63 has been pressed. If the system control unit 50 determines that the second shutter switch 63 has been pressed (YES in step S508), the movie recording is ended. If the system control unit 50 determines that the second shutter switch 63 has not been pressed (NO in step S508), the processing returns to step S504.

In step S509, the system control unit 50 determines whether or not the number of recorded movies N is 1. If the system control unit 50 determines that the number of recorded movies N is 1 (YES in step S509), the processing proceeds to step S510. If the system control unit 50 determines that the number of recorded movies N is not 1 (NO in step S509), the processing proceeds to step S516.

In step S510, the system control unit 50 displays the shooting-in-progress indicator 707 in which the first section is displayed in white. Since the first section is displayed in white, and the second and the subsequent sections are displayed in gray, it can be seen that the second movie is being recorded. In this manner, in the present exemplary embodiment, during a recording of a chapter, whether or not the recordings of the other three chapters have finished is displayed together with the progress of the chapter being recorded. Thus, the user can recognize which chapter among the four movies is being recorded, and which point of the chapter is being recorded. In addition, the recording progress up to the completion of a set of movies can be recognized.

In step S511, the system control unit 50 causes the system timer 53 to start measuring a rewriting time.

In step S512, the system control unit 50 determines whether or not the rewriting time Tα has elapsed from the latest measurement start of the rewriting time in step S511. If the system control unit 50 determines that the rewriting time Tα has elapsed (YES in step S512), the processing proceeds to step S513. If the system control unit 50 determines that the rewriting time Tα has not elapsed (NO in step S512), the system control unit 50 keeps waiting until the rewriting time Tα elapses.

In step S513, as illustrated in a shooting-in-progress indicator 707 (2), the system control unit 50 displays (switches the display color to white) a progress rate according to the elapsed time from the recording start, in the second section 707b among the four sections with the width of the drawing pixel width DrawW calculated in step S403.

In step S514, the system control unit 50 determines whether or not the recording time RecT set in step S402 has elapsed from the measurement start of the recording time in step S501. If the system control unit 50 determines that the recording time RecT has elapsed (YES in step S514), the movie recording is ended. If the system control unit 50 determines that the recording time RecT has not elapsed (NO in step S514), the processing proceeds to step S515.

In step S515, the system control unit 50 determines whether or not the second shutter switch 63 has been pressed. If the system control unit 50 determines that the second shutter switch 63 has been pressed (YES in step S515), the movie recording is ended. If the system control unit 50 determines that the second shutter switch 63 has not been pressed (NO in step S515), the processing returns to step S511.

In step S516, the system control unit 50 determines whether or not the number of recorded movies N is 2. If the system control unit 50 determines that the number of recorded movies N is 2 (YES in step S516), the processing proceeds to step S517. If the system control unit 50 determines that the number of recorded movies N is not 2 (NO in step S516), the processing proceeds to step S523.

In step S517, the system control unit 50 displays the shooting-in-progress indicator 707 in which the first and the second sections are displayed in white. Among the four sections of the shooting-in-progress indicator 707, the first and the second sections are displayed in white, and the third and the subsequent section are displayed in gray. Thus, it can be seen that the third movie is being recorded.

In step S518, the system control unit 50 causes the system timer 53 to start measuring a rewriting time.

In step S519, the system control unit 50 determines whether or not the rewriting time Tα has elapsed from the latest measurement start of the rewriting time in step S518. If the system control unit 50 determines that the rewriting time Tα has elapsed (YES in step S519), the processing proceeds to step S520. If the system control unit 50 determines that the rewriting time Tα has not elapsed (NO in step S519), the system control unit 50 keeps waiting until the rewriting time Tα elapses.

In step S520, the system control unit 50 displays (switches the display color to white) a progress rate according to the elapsed time from the recording start, in the third section 707c among the four sections of shooting-in-progress indicator 707, with the width of the drawing pixel width DrawW calculated in step S403.

In step S521, the system control unit 50 determines whether or not the recording time RecT set in step S402 has elapsed from the measurement start of the recording time in step S501. If the system control unit 50 determines that the recording time RecT has elapsed (YES in step S521), the movie recording is ended. If the system control unit 50 determines that the recording time RecT has not elapsed (NO in step S521), the processing proceeds to step S522.

In step S522, the system control unit 50 determines whether or not the second shutter switch 63 has been pressed. If the system control unit 50 determines that the second shutter switch 63 has been pressed (YES in step S522), the movie recording is ended. If the system control unit 50 determines that the second shutter switch 63 has not been pressed (NO in step S522), the processing returns to step S518.

In step S523, the system control unit 50 displays the shooting-in-progress indicator 707 in which the first to the third sections are displayed in white. Among the four sections of the shooting-in-progress indicator 707, the first to the third sections are displayed in white, and the fourth section is displayed in gray. Thus, it can be seen that the fourth movie is being recorded.

In step S524, the system control unit 50 causes the system timer 53 to start measuring a rewriting time.

In step S525, the system control unit 50 determines whether or not the rewriting time Tα has elapsed from the latest measurement start of the rewriting time in step S524. If the system control unit 50 determines that the rewriting time Tα has elapsed (YES in step S525), the processing proceeds to step S526. If the system control unit 50 determines that the rewriting time Tα has not elapsed (NO in step S525), the system control unit 50 keeps waiting until the rewriting time Tα elapses.

In step S526, as illustrated in a shooting-in-progress indicator 707 (3), the system control unit 50 displays (switches the display color to white) a progress rate according to the elapsed time from the recording start, in the fourth section 707d among the four sections with the width of the drawing pixel width DrawW calculated in step S403.

In step S527, the system control unit 50 determines whether or not the recording time RecT set in step S402 has elapsed from the measurement start of the recording time in step S501. If the system control unit 50 determines that the recording time RecT has elapsed (YES in step S527), the movie recording is ended. If the system control unit 50 determines that the recording time RecT has not elapsed (NO in step S527), the processing proceeds to step S528.

In step S528, the system control unit 50 determines whether or not the second shutter switch 63 has been pressed. If the system control unit 50 determines that the second shutter switch 63 has been pressed (YES in step S528), the movie recording is ended. If the system control unit 50 determines that the second shutter switch 63 has not been pressed (NO in step S528), the processing returns to step S524.

As described above, in steps S504 to S508, S511 to S515, S518 to S522, and S524 to S528, after the start of movie recording, every time the rewriting time Tα elapses, the display color of a section is switched from gray to white with the width of the drawing pixel width DrawW calculated in step S403. In this manner, in the present exemplary embodiment, aside from the progress of the creation of a series of movies constituting a set, the recording progress (elapsed time in the recording time) of one movie (chapter) included in the set can be recognized through the display of the indicator (within the section). In addition, the user can recognize, through the display of the indicator, the progress rate, i.e., how much longer it takes to end the recording of one chapter being recorded.

The creative movie recording in the present exemplary embodiment will be described below based on the two points, specifically, the display of the indicator and the display of the movie recording end GUI button.

<Indicator Display>

In this manner, according to the exemplary embodiment described above, when a series of movies constituting a set is created from a plurality of movies, the user can recognize the recording progress (progress status) among all the movies included in the set of movies. In other words, during the creation of the set of movies (while recording movies included in the set of movies and during standby), a section corresponding to a recorded chapter is displayed in white, whereas a section corresponding to a not-recorded chapter is displayed in gray. Furthermore, during recording, the display color of a section corresponding to a chapter being recorded is switched from gray to white according to the progress of recording. More specifically, the display color of a recording-finished portion of each chapter is switched from gray to white. As a result, the progress of the recording can be visually recognized through the display of the indicator. The standby indicator is smaller than the shooting-in-progress indicator, and is displayed in such a manner that an area where the standby indicator is displayed in a state of being overlapped with the live view image becomes smaller. The standby indicator indicates, by the display colors of sections indicating the statuses of respective recordings, whether the recording has finished. As a result, during the standby before recording a movie, the progress of the recording can be recognized while viewing the live view image. The shooting-in-progress indicator is larger than the standby indicator, and is displayed in such a size that a change in the display color of a portion within one section (the rate of the display indicating the finished recording) is recognizable, and with such a broad section width that the progress can be visually recognized with ease. During recording, the display is updated at certain periods so that the progress is recognizable. Thus, the recording-finished portion (recording-finished chapter and recording-finished portion within the chapter being recorded) and the progress until the recording end can be recognized. The display indicating the recording-finished chapter, and the display indicating the rate of the recording-finished portion within one chapter are similarly displayed in white. Furthermore, the display colors of the display indicating the recording-finished chapter and the display indicating the rate of the recording-finished portion within one chapter are switched in the same direction.

In addition, in the shooting-in-progress indicator, the sections are displayed in an equal width (the length in which the display color is changed from the recording start to the recording end) irrespective of the recording time of each chapter. Thus, the user can recognize the progress until the recording end of one chapter. In the creative movie recording, a series of movies constituting a set is created by the four chapters including chapters with different recording times and reproduction times. Therefore, if the progress is displayed by the rate constituting a set of movies instead of displaying the recording progress in time unit, the user can recognize the progress of the creation of a set of movies more easily. In addition, the user can create a set of movies with an effect being applied only by recording the movies without manually editing the recorded movies.

<Display of Movie Recording End GUI Button>

Furthermore, according to the exemplary embodiment described above, in response to the creative movie recording being started, the movie recording GUI button 702 on the touch panel 70a is hidden, and the movie recording end GUI button 717 is also not displayed. In other words, the user cannot issue a movie recording end instruction by the same operation (touch operation) as the operation for issuing a movie recording start instruction. This prevents the movie recording from being casually interrupted. In addition, since this prevents the movie recording from being casually interrupted, the possibility that a movie with a halfway effect is generated is reduced. In the present exemplary embodiment, an effect applied to a movie is associated with a recording time and a reproduction time. Thus, if an actual recording time is less than the set recording time, an effect set to be applied to one movie is halfway applied thereto. The movie recording end instruction can be issued by the press of the second shutter switch 63 (the image capturing instruction method for still images), but this is not the same touch operation as the movie recording start instruction. Accordingly, the movie recording start instruction and the movie recording end instruction cannot be easily issued by the same operation, unlike the movie recording in the automatic mode. In addition, the movie recording end GUI button 717 (movie recording end instruction unit), which is displayed in the automatic mode, is not displayed. This makes the user recognize that it is desirable not to end movie recording halfway, and also prevents the user from thinking of an idea of ending the movie recording in the first place. In addition, the movie recording end GUI button 717 is not displayed. This can reduce the stress given to the user compared with a case in which the movie recording end GUI button 717 is displayed, but even if a touch operation is performed thereon, the movie recording end GUI button 717 actually does not receive the movie recording end instruction. Furthermore, the system control unit 50 does not need to perform an unnecessary display process, which can reduce processing load. As described above, in the present exemplary embodiment, the movie recording end GUI button 717 is not displayed during the creative movie recording, thereby increasing the possibility that a set of movies having a set effect can be created.

In addition, during the recording onto the recording medium 200, different effects such as the slow motion/quick motion/image lag effects are applied to movies, so that the user can record movies without being conscious of, during the recording, the effects to be applied to the movies. In this manner, while recording movies, only the progress of the movie recording is displayed, and neither an effect to be applied thereto nor a movie with an effect being applied is displayed. Thus, the user performs recording without being conscious of an effect. As a result, a set of movies unexpected by the user can be created. In addition, based on recorded movies, the user can obtain a set of unique movies being different from a normal movie with no effect being applied, without performing editing work of movies.

In addition, in the present exemplary embodiment, the description has been given of a case in which a movie to which a set effect is to be applied is recorded onto the recording medium 200 after the effect being applied thereto. The present invention, however, is not limited thereto, and is effective also in the recording of a movie to be reproduced with an effect being applied. In such a case, an effect to be applied to a set of movies is recorded in association with the set of movies. Also in a case in which a movie is reproduced with an effect being applied, if the recording of the movie is casually interrupted by the user, the effect may be applied halfway to the movie, so that a high-quality movie may not be obtained. More specifically, a recorded movie is recorded as a movie file without an effect being applied, and the type and the section of the effect to be applied for reproduction are stored as attribute information of the movie file. Then, before reproducing the movie, the effect indicated by the attribute information is applied to the movie read from the movie file, and the resultant movie is reproduced. In this manner, the present invention is also applicable to movie recording performed in a case in which it is known in advance that an effect is to be applied for reproduction. In addition, the description has been given of a case in which a recorded movie is recorded onto the recording medium 200. Alternatively, the present invention is also effective in a case in which the recorded movie is temporarily recorded (arranged) into a buffer memory, and then recorded into a nonvolatile memory.

In addition, in the present exemplary embodiment, the description has been given of a case in which a recording time, a drawing pixel width DrawW, and an effect are set before each recording. Alternatively, recording times, drawing pixel widths DrawW, and effects of all the four movies may be determined in response to the first movie included in a set of movies being started to be recorded. Yet alternatively, effects to be applied to the four movies may be determined in association, and recorded into the system memory 52.

In addition, in the present exemplary embodiment, the description has been given of a case in which the shooting-in-progress indicator is displayed in a larger size than that of the standby indicator so that the progress of each section is visible, whereas the standby indicator is displayed in such a manner that the overlapped area with the live view image becomes smaller. The display size and the shape, however, are not limited to those in the provided example. In a case in which the live view image is displayed with so-called pillar boxes during the standby so that the regions outside the range to be recorded are not displayed, as illustrated in FIG. 7B, instead of displaying the live view image throughout the entire display unit 28 as illustrated in FIG. 7A, the standby indicator and the shooting-in-progress indicator may be displayed in the same size. In the present exemplary embodiment, the indicator is expressed by the simple rectangle. Alternatively, the indicator may have an arc-like shape as illustrated in FIG. 6C or other shapes. Also in a case in which the progress is indicated on the arc as illustrated in FIG. 6C, it is only required that a section corresponding to a recorded movie is displayed in white while a section corresponding to a not-recorded movie is displayed in gray. Alternatively, the progress may be indicated by a sector like a drawing pixel width DrawW 608. The display position of the indicator has been described to be the lower side of the display unit 28 in the present exemplary embodiment. Alternatively, the indicator may be displayed on the upper side, the left side, or the right side of the display unit 28. In addition, the display colors of the sections of the indicator that indicate the respective movies may be individually set for each section. For example, before the start of the creation of a set of movies, all the sections are similarly displayed in gray, but the respective display colors of the first, the second, the third, and the fourth sections may be switched to white, orange, brown, and black, respectively. In addition, the display color of the indicator may be settable. In addition, in the present exemplary embodiment, the description has been given of a case in which the display indicating a recording-unfinished portion is filled with gray while the display indicating a recording-finished portion is filled with white. This is merely an example, and any color may be set as long as the recording-finished portion and the recording-finished portion are identifiable.

In addition, the display sizes, the display positions, and the shapes of the live view image, the indicator, the movie recording GUI button, the movie recording end GUI button, and other display objects that have been described in the present exemplary embodiment are merely examples to which the present invention is applicable.

In addition, the description has been given of a case in which an effect to be applied to each movie is determined irrespective of the content of a movie to be recorded by the user. Alternatively, the configuration may be such that the user sets an effect to be applied to each movie, and the movie with the set effect being applied can be recorded onto the recording medium 200. Furthermore, an effect may be similarly applied to all the movies included in a set of movies, only one effect may be applied to a movie corresponding to one chapter, or effect may not be applied.

In addition, the description has been given of a case in which an effect to be applied to each movie is determined irrespective of the user's intention, before recording the movie. Alternatively, the effect may be automatically determined according to a predetermined condition that is based on an object and the content of a movie that are intended by the user. Yet alternatively, the effect may be freely-determinable by the user. In addition, instead of being automatically selected from among 3, 4, and 6 seconds, the candidate length of a recording time may be settable by the user, or another candidate length such as 5 and 8 seconds may be added. In addition, the description has been given of a case in which an effect is applied in such a manner that a reproduction time becomes 4 to 7 seconds. The reproduction time, however, is not limited to these times, and may be 10 or 20 seconds, or 2 or 3 seconds. The candidate reproduction times are not limited to those provided in the above-described example. In addition, the number of movies constituting a set of movies may not be four, and may be presettable by the user. In addition, the number of movies finally constituting a set of movies may not match the number of movies to be recorded. In other words, a set of movies may include recorded movies obtained by applying a plurality of different effects to one recorded movie, or recorded movies obtained by applying an effect to one movie, and by applying no effect to the one movie.

In addition, in the present exemplary embodiment, the description has been given of a case in which an effect to be applied to each movie is randomly selected irrespective of an object. Alternatively, the effect may be selected according to the size of the motion of the object. For example, the image lag effect or the slow motion effect may be selected if the size of the motion of the object is equal to or larger than a predetermined size. In addition, in the present exemplary embodiment, as for the color filter/brightness combination effects, the same effect is applied to all the four recordings. Alternatively, the color filter/brightness may be set in each recording. Nevertheless, a reproduction time does not become longer or shorter than a recording time due to the color filter or the brightness combination effect being applied.

In addition, in the present exemplary embodiment, the description has been given of a case in which creative movie recording is ended upon the second shutter switch 63 being pressed during the creative movie recording, even if a set recording time has not elapsed. Alternatively, after the second shutter switch 63 is pressed during the creative movie recording, a warning indicating that if the second shutter switch 63 is pressed, the creative movie recording is ended and a halfway movie is recorded may be issued without stopping the movie recording. In addition, if the user issues an end instruction (presses the second shutter switch 63) even though the warning is issued, the end instruction may be received. In addition, at the start of the creative movie recording, a warning indicating that if the second shutter switch 63 is pressed, the creative movie recording is ended may be issued in advance.

In addition, in the present exemplary embodiment, the description has been given of a case in which a recording time is preset for a movie to be recorded as each chapter, and the recording is stopped in response to the lapse of the recording time. A recording time may not be necessarily the preset one. In other words, as a predetermined condition regarding the stop of recording of a movie to which a desired effect is to be applied, aside from the recording time, the motion of an object and the change in color temperature or brightness may be used. For example, in a case in which the slow motion or the image lag effect is to be applied, if an object does not move so much, a movie has little change when a chapter is viewed, so that a movie uninteresting for the user is obtained. In view of the foregoing, motion detection of a movie being recorded is performed, and the recording may be stopped in response to the detection that the motion of an object becomes equal to or greater than a predetermined amount. Alternatively, for example, in a case in which the slow motion effect is to be applied, if a movie in which an object sufficiently moves is recorded, a movie interesting for the user as a slow motion movie is obtained. Thus, in such a case, recording may be stopped in response to the motion of the object becoming equal to or larger than a predetermined amount. Alternatively, in a case in which it can be determined that a recording scene has changed, for example, by detecting that another object than the object having been moved is detected, the slow motion effect, the image lag effect, and the like may be applied, and movie recording may be stopped.

Furthermore, the description has been given of a case in which the number of chapters included in a set of movies is preset. Alternatively, the number of chapters may be changed according to the motion of an object and the change in color temperature or brightness. For example, in response to it being determining that there is little change in the motion of an object when, among a plurality of recorded chapters, the chapters are compared with each other, the recording may be stopped so as not to continue the recording any more. In addition, in a case in which the change of an object increases as the recording progresses, and it is determined that increasing the number of chapters results in the creation of a set of movies more interesting for the user, the number of chapters to be recorded may be increased.

In addition, the description has been given of a case in which, during creative movie recording, the progress rate display of the indicator proceeds (the display color of the indicator is changed) in response to the rewriting time Tα elapse. Alternatively, the recording progress may be indicated by color density. The description of such a case will be described assuming that a recording-unfinished portion is expressed in black while a recording-finished portion is expressed in white. At the start of recording, all the regions of a section corresponding to a chapter being recorded are displayed in black, and as the recording progresses, the display color gradually becomes pale, i.e., changes from gray close to black to gray close to white. Then, all the regions of the section are displayed in white in response to a recording time elapse. In addition, during recording standby, a section corresponding to a not-recorded chapter is displayed in black while a section corresponding to a recorded chapter is displayed in white. The user can thereby recognize the progress of the recording among all the movies both during recording and during recording standby. The display colors indicating a recording-unfinished portion and a recording-finished portion are not limited to the above-described colors. The display colors may be any color, and the color change may not be between two colors. The display color may change to various colors, such as yellow, orange, red, purple, blue, and green. In addition, the display colors of all the regions of a corresponding section may not be evenly changed. For example, a region indicated by the gradation from black to white may be provided, and as the recording progresses, the region may proceed little by little (by a predetermined amount) according to the progress rate. In such a case, the user can also recognize the recording progress through the color change.

In addition, control by the system control unit may be performed by a single hardware component. Alternatively, a plurality of hardware components may share processes, thereby controlling the entire apparatus.

In addition, the present invention has been described in detail based on a desirable exemplary embodiment thereof. The present invention, however, is not limited to these specific exemplary embodiments, and various configurations without departing from the gist of the present invention are included in the present invention. Furthermore, each exemplary embodiment described above merely indicates an exemplary embodiment of the present invention.

In addition, in the above-described exemplary embodiment, the description has been given of an example case in which control regarding the display of recording progress of the present invention is applied to the digital camera. Such control, however, is not limited to this example, and applicable to any image capturing control apparatuses or electronic apparatuses as long as the apparatus can control recording of a movie to which an effect is to be applied. In other words, the present invention is applicable to a personal computer, a personal digital assistance (PDA), a portable phone terminal, a portable image viewer, a printer apparatus having a display, a digital photo frame, a music player, a game apparatus, an electronic book reader, and the like.

Furthermore, in the above-described exemplary embodiment, the description has been given of an example case in which control regarding the recording stop of the present invention is applied to the digital camera. Such control, however, is not limited to this example, and applicable to any display control apparatuses or electronic apparatuses as long as the apparatus can create a set of movies from a plurality of movies. In other words, the present invention is applicable to a personal computer, a PDA, a portable phone terminal, a portable image viewer, a music player, a game apparatus, an electronic book reader, and the like that have a camera function or a function of controlling a camera.

The present invention is also realized by executing the following processing. More specifically, the processing is executed in such a manner that software (a program) for realizing the function of the above exemplary embodiment is supplied to a system or an apparatus via a network or various recording mediums, and a computer (or a CPU, a micro processing unit (MPU), or the like) of the system or the apparatus reads and executes a program code. In this case, a program and a storage medium storing the program constitute the present invention.

According to the present invention, among a set of movies constituted by a plurality of movies, the user can easily recognize the recording progress among all the movies constituting the set.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display control apparatus comprising:
one or more processors that operate to:
perform processing on a movie; and
perform control so as to display an indicator indicating progress of the processing on a set of movies constituted by a plurality of movies together with a movie on which the processing is being performed, the indicator being displayed on a display;
wherein the indicator is displayed in such a way that a plurality of sections respectively corresponding to the plurality of movies is identifiable, each of the plurality of sections corresponding to a different one of the plurality of movies, and a section corresponding to a movie among the plurality of movies is displayed even if the processing has not been performed on the movie,
wherein, while the one or more processors are performing the processing, the progress of the processing is displayed in a section of the indicator corresponding to the movie on which the processing is being performed, and
wherein even if the plurality of movies includes a movie having a length different from at least one of the other movies, the plurality of sections respectively corresponding to the plurality of movies is displayed in a same length as each other.

2. The display control apparatus according to claim 1, wherein a part corresponding to a movie on which the processing has been performed and a part corresponding to a movie on which the processing has not been performed in the set of movies are displayed in the indicator in different display forms.

3. The display control apparatus according to claim 2, wherein the one or more processors display on the display the part corresponding to the movie on which the processing has been performed and the part corresponding to the movie on which the processing has not been performed in different colors.

4. The display control apparatus according to claim 1, wherein the one or more processors display on the display the progress in a section based on a ratio of a length of the movie on which the processing has been performed to a total length of a movie corresponding to the section in each of the plurality of sections.

5. The display control apparatus according to claim 1, wherein the plurality of sections respectively corresponding to the plurality of movies is arranged in order of performing the processing.

6. The display control apparatus according to claim 1, wherein a length of the movie is predetermined in each of the plurality of sections of the indicator.

7. The display control apparatus according to claim 1, wherein the processing is movie capturing processing or recording processing.

8. A display control apparatus comprising:
one or more processors that operate to:
receive an instruction to capture a movie from a user;
cause a sensor or camera to capture a movie in response to the received instruction;

generate a set of movies from a plurality of movies respectively corresponding to a plurality of instructions, each of the plurality of movies corresponding to a different one of the plurality of instructions; and perform control so as to display, on a display, an indicator indicating progress of capturing a movie started in response to the received instruction together with a movie captured by the sensor or camera, wherein the one or more processors display on the display, as one indicator, progress of capturing the plurality of movies respectively corresponding to the plurality of instructions for the set of movies, and wherein the one or more processors display the indicator in such a way that a plurality of sections respectively corresponding to the plurality of movies corresponding to the plurality of instructions is identifiable, each of the plurality of sections corresponding to a different one of the plurality of movies.

9. The display control apparatus according to claim 8, wherein the one or more processors display the plurality of sections corresponding to the plurality of movies in order of capturing the movies.

10. The display control apparatus according to claim 8, wherein the one or more processors display a section corresponding to a captured movie and a section corresponding to a movie that has not been captured in the indicator in different display forms.

11. The display control apparatus according to claim 10, wherein the one or more processors start, in response to reception of the instruction, displaying progress of a movie captured in response to the instruction in the section corresponding to the movie that has not been captured adjacent to the section corresponding to the captured movie.

12. A control method of controlling a display control apparatus, the control method comprising:

performing processing on a movie; and performing display control so as to display an indicator indicating progress of the processing on a set of movies constituted by a plurality of movies together with a movie on which the processing is being performed;

wherein the indicator is displayed in such a way that a plurality of sections respectively corresponding to the plurality of movies is identifiable, each of the plurality of sections corresponding to a different one of the plurality of movies, and a section corresponding to a movie among the plurality of movies is displayed even if the processing has not been performed on the movie, wherein, while the processing is being performed, the progress of the processing is displayed in a section of the indicator corresponding to the movie on which the processing is being performed, and wherein even if the plurality of movies includes a movie having a length different from at least one of the other movies, the plurality of sections respectively corresponding to the plurality of movies is displayed in a same length as each other.

13. A non-transitory computer-readable storage medium storing a program for causing a computer to execute the control method of controlling the display control apparatus according to claim 12.

14. A control method of controlling a display control apparatus, the control method comprising:

receiving an instruction to capture a movie from a user;

generating a set of movies from a plurality of movies captured by a sensor or camera in response to a plurality of instructions, each of the plurality of movies corresponding to a different one of the plurality of instructions; and performing display control so as to display an indicator indicating progress of capturing a movie started in response to the instruction together with a movie captured by the sensor or camera, wherein, in the display control, progress of capturing the plurality of movies respectively corresponding to the plurality of instructions for the set of movies is displayed as one indicator, and wherein the indicator is displayed in such a way that a plurality of sections respectively corresponding to the plurality of movies corresponding to the plurality of instructions is identifiable, each of the plurality of sections corresponding to a different one of the plurality of movies.

15. A non-transitory computer-readable storage medium storing a program for causing a computer to execute the control method of controlling the display control apparatus according to claim 14.

* * * * *